(12) United States Patent
Tang et al.

(10) Patent No.: US 11,812,254 B2
(45) Date of Patent: *Nov. 7, 2023

(54) GENERATING SCENE-AWARE AUDIO USING A NEURAL NETWORK-BASED ACOUSTIC ANALYSIS

(71) Applicant: Adobe Inc., San Jose, CA (US)

(72) Inventors: Zhenyu Tang, Greenbelt, MD (US); Timothy Langlois, Seattle, WA (US); Nicholas Bryan, Belmont, CA (US); Dingzeyu Li, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,918

(22) Filed: Nov. 1, 2021

(65) Prior Publication Data

US 2022/0060842 A1  Feb. 24, 2022

Related U.S. Application Data

(63) Continuation of application No. 16/674,924, filed on Nov. 5, 2019, now Pat. No. 11,190,898.

(51) Int. Cl.
*H04S 7/00* (2006.01)
*G06N 3/08* (2023.01)
*G06N 3/04* (2023.01)

(52) U.S. Cl.
CPC ............... *H04S 7/305* (2013.01); *G06N 3/04* (2013.01); *G06N 3/08* (2013.01); *H04S 7/307* (2013.01); *H04S 2400/11* (2013.01)

(58) Field of Classification Search
CPC ...... H04S 2400/11; H04S 7/301; H04S 7/307; H04S 2420/07; H04R 3/04

(Continued)

(56) References Cited

U.S. PATENT DOCUMENTS 9,940,922 B1 * 4/2018 Schissler ................ H04S 7/305
2004/0174931 A1   9/2004 Lee (Continued)

OTHER PUBLICATIONS

J. S. Abel, N. J. Bryan, P. P. Huang, M. Kolar, and B. V. Pentcheva. Estimating room impulse responses from recorded balloon pops. In Audio Engineering Society Convention 129. Audio Engineering Society, 2010.

(Continued)

*Primary Examiner* — Alexander Krzystan
(74) *Attorney, Agent, or Firm* — Keller Preece PLLC

(57) ABSTRACT

Methods, systems, and non-transitory computer readable storage media are disclosed for rendering scene-aware audio based on acoustic properties of a user environment. For example, the disclosed system can use neural networks to analyze an audio recording to predict environment equalizations and reverberation decay times of the user environment without using a captured impulse response of the user environment. Additionally, the disclosed system can use the predicted reverberation decay times with an audio simulation of the user environment to optimize material parameters for the user environment. The disclosed system can then generate an audio sample that includes scene-aware acoustic properties based on the predicted environment equalizations, material parameters, and an environment geometry of the user environment. Furthermore, the disclosed system can augment training data for training the neural networks using frequency-dependent equalization information associated with measured and synthetic impulse responses.

20 Claims, 14 Drawing Sheets

(58) Field of Classification Search
USPC .................. 381/63, 303, 310, 103; 700/94
See application file for complete search history.

(56) References Cited

U.S. PATENT DOCUMENTS

| | | | |
|---|---|---|---|
| 2017/0223478 A1* | 8/2017 | Jot | H04S 7/306 |
| 2019/0028829 A1 | 1/2019 | Raghavendra et al. | |
| 2019/0166435 A1* | 5/2019 | Crow | H04R 25/43 |

OTHER PUBLICATIONS

M. Barron. Auditorium acoustics and architectural design.E & FN Spon, 2010.

M. Bloesch, J. Czarnowski, R. Clark, S. Leutenegger, and A. J. Davison. Codeslam learning a compact, optimisable representation for dense visual slam. In The IEEE Conference on Computer Vision and Pattern Recognition (CVPR), Jun. 2018.

I. Bork. A comparison of room simulation software-the 2nd round robin on room acoustical computer simulation. Acta Acustica united with Acustica, 86(6):943-956, 2000.

N. J. Bryan. Data augmentation and deep convolutional neural networks for blind room acoustics parameter estimation. arXiv preprint arXiv:1909.03642, 2019.

N. J. Bryan, J. S. Abel, and M. A. Kolar .Impulse response measurements in the presence of clock drift. In Audio Engineering Society Convention 129. Audio Engineering Society, 2010.

C. Cao, Z. Ren, C. Schissler, D. Manocha, and K. Zhou. Bidirectional sound transport. The Journal of the Acoustical Society of America. 141(5):3454-3454, 2017.

M. Cartwright, B. Pardo, G. J. Mysore, and M. Hoffman. Fast and easy crowdsourced perceptual audio evaluation. In 2016 IEEE International Conference on Acoustics, Speech and Signal Processing (ICASSP), pp. 619-623. IEEE, 2016.

L. Chen, Z. Li, R. K Maddox, Z. Duan, and C. Xu. Lip movements generation at a glance. In The European Conference on Computer Vision (ECCV), Sep. 2018.

F. Chollet et al. Keras. https://keras.io, 2015.

A. I. Conference. Audio for virtual and augmented reality. AES Proceedings, 2018.

P. Debevec. Image-based lighting. IEEE Computer Graphics and Applications, 22(2):26-34, 2002.

M. Doulaty, R. Rose, and O. Siohan. Automatic optimization of data perturbation distributions for multi-style training in speech recognition. In Spoken Language Technology Workshop, 2017.

J. Eaton, N. D. Gaubitch, A. H. Moore, P. A. Naylor, J. Eaton, N. D. Gaubitch, A. H. Moore, P. A. Naylor, N. D. Gaubitch, J. Eaton, et al. Estimation of room acoustic parameteres: The ace challenge. IEEE/ACM Transactions on Audio, Speech and Language Processing (TASLP), 24(10):1681-1693, 2016.

S. E. Eskimez, P. Soufleris, Z. Duan, and W. Heinzelmann. Frontend speech enhancement for commercial speaker verification systems. Speech Communication, 99:101-113, 2018.

C. Evers, A. H. Moore, and P. A. Naylor. Acoustic simultaneous localization and mapping (a-slam) of a moving microphone array and its surrounding speakers. In 2016 IEEE International Conference on Acoustics, Speech and Signal Processing (ICASSP), pp. 6-10. IEEE, 2016.

A. Farina. Simultaneous measurements of impulse response and distortion with a swept-sine technique. In Audio Engineering Society Convention 108. Audio Engineering Society, 2000.

S. Foster. Impulse response measurement using golay codes. In ICASSP'86. IEEE International Conference on Acoustics, Speech, and Signal Processing, vol. 11, pp. 929-932. IEEE, 1986.

M.-A. Gardner, K. Sunkavalli, E. Yumer, X. Shen, E. Gambaretto, C. Gagné, and J.-F. Lalonde. Learning to predict indoor illumination from a single image. arXiv preprint arXiv:1704.0090, 2017.

S. Gharib, H. Derrar, D. Niizumi, T. Senttula, J. Tommola, T. Heittola, T. Virtanen, and H. Huttunen. Acoustic scene classification: A competition review. In 2018 IEEE 28th International Workshop on Machine Learning for Signal Processing (MLSP), pp. 1-6. IEEE, 2018.

C. Hak, R. Wenmaekers, and L. Van Luxemburg. Measuring room impulse responses: Impact of the decay range on derived room acoustic parameters. Acta Acustica united with Acustica, 98(6):907-915, 2012.

S. Hershey, S. Chaudhuri, D. P. Ellis, J. F. Gemmeke, A. Jansen, R. C. Moore, M. Plakal, D. Platt, R. A. Saurous, B. Seybold, et al. Cnn architectures for large-scale audio classification. In 2017 ieee international conference on acoustics, speech, and signal processing (icassp), pp. 131-135. IEEE, 2017.

G. Hinton, L. Deng, D. Yu, G. Dahl, A.-r. Mohamed, N. Jaitly, A. Senior, V. Vanhoucke, P. Nguyen, B. Kingsbury, et al. Deep neural networks for acoustic modeling in speech recognition. IEEE Signal processing magazine, 29, 2012.

Y. Hold-Geoffroy, K. Sunkavalli, S. Hadap, E. Gambaretto, and J.-F. Lalonde. Deep outdoor illumination estimation. In Proceedings of the IEEE Conference on Computer Vision and Pattern Recognition, pp. 7312-7321, 2017.

M. Karjalainen, P. Antsalo, A. Makivirta, T. Peltonen, and V. Valimaki. Estimation of modal decay parameters from a noisy response measurements. In Audio Engineering Society Convention 110. Audio Engineering Society, 2001.

C. Kim, A. Misra, K. Chin, T. Hughes, A. Narayanan, T. N. Sainath, and. M. Bacchiani. Generation of large-scale simulated utterances in virtual rooms to train deep-neural networks for far-field speech recognition in google home. In Interspeech, 2017.

H. Kim, L. Remaggi, P. Jackson, and A. Hilton. Immersive spatial audio reproduction for vr/ar using room acoustic modelling from 360 images. Proceedings IEEE VR2019, 2019.

D. P. Kingma and J. Ba. Adam: A method for stochastic optimization. arXiv preprint arXiv:1412.6980, 2014.

M. Kleiner, P. Svensson, and B.-I. Dalenback. Auralization: experiments in acoustical cad. In Audio Engineering Society Convention 89. Audio Engineering Society, 1990.

H. Kuttruff. Room Acoustics. Taylor & Francis Group, London, U.K., 6th ed., 2016.

P. Larrsson, D. Vastfjall, and M. Kleiner. Better presence and performance in virtual enviroments by improved binaural sound rendering. In Virtual, Synthetic, and Entertainment Audio confernce, Jun. 2002.

C. LeGendre, W.-C. Ma, G. Fyffe, J. Flynn, L. Charbonnel, J. Busch, and P. Debevec. Deeplight: Learning illumination for unconstrained mobile mixed reality. In Proceedings of the IEEE Conference on Computer Vision and Pattern Recognition, pp. 5918-5928, 2019.

D. Li, T. R. Langlois, and C. Zheng. Scene-aware audio for 360° videos. ACM Trans. Graph., 374(4), 2018.

R. Mehra, A. Rungta, A. Golas, M. Lin, and D. Manocha. Wave: Interactive wave-based sound propagation for virtual enviroments. IEEE transaction on visualization and computer graphics, 21(4):434-442, 2015.

N. Morales and D. Manocha. Efficient wave-based acoustic material design optimization. Coputer-Aided Design, 78:83-92, 2016.

N. Morales, R. Mehra, and D. Manocha. A parallel time-domain wave simulator based on rectangular decomposition for distributed memory architectures. Applied Acoustics, 97:104-114, 2015.

N. Morales, Z. Tang, and D. Manocha. Receiver placement for speech enhancement using sound propagation optimization. Applied Acoustics, 155:53-62, 2019.

G. J. Mysore. Can we automatically transform speech recorded on common consumer devices in real-world enviroments into professional production quality speech?a dataset, insights, and challenges. IEEE Signal Processing Letters, 22(8):1006-1010, 2014.

V. Nair and G. E. Hinton. Rectified linear units improve restricted boltzmann machines. In Proceedings of the 27th international conference on machine learning (ICML-10), pp. 807-814, 2010.

S. Pelzer, L. Aspock, D. Schroder, and M. Vorlander. Integrating real-time room acoustics simulation into a cad modeling software to enhance the architectural design process. Buildings, 4(2):113-138, 2014.

(56) References Cited

OTHER PUBLICATIONS

N. Raghuvanshi and J. Snyder. Parametric wave field coding for pre-computed sound propagation. ACM Transactions on Graphics (TOG), 33(4):38, 2014.

N. Raghuvanshi, J. Snyder, R. Mehra, M. Lin, and N. Govindaraju. Pre-computed wave simulation for real-time sound propagation of dynamic sources in complex scenes. ACM Trans. Graph., 29(4):68:1-68:11, Jul. 2010. doi: 10.1145/1778765.1778805.

Z. Ren, H. Yeh, and M. C. Lin. Example-guided physically based modal sound synthesis. ACM Transaction on Graphics (TOG), 32(1):1, 2013.

L. Rizzi, G. Ghelfi, and M. Santini. Small-rooms dedicated to music: From room response analysis to acoustic design. In Audio Engineering Society Convention 140. Audio Engineering Society, 2016.

A. Rungta, C. Schissler, N. Rewkowski, R. Mehra, and D. Manocha. Diffraction Kernels for interactive sound propagation in dynamic enviroments. IEEE transactions on visualization and computer graphics, 24(4):1613-1622, 2018.

J. Salamon and J. P. Bello. Deep convolutional neural networks and data augmentation for enviromental sound classification. IEEE Signal Processing Letters, 24(3):279-283, 2017.

L. Savioja and U. P. Svensson. Overview of geometrical room acoustic modeling techniques. The Journal of the Acoustical Society of America, 138(2):708-730, 2015. doi: 10.1121/1.4926438.

R. W. Schafer and A. V. Oppenheim. Discrete-time signal processing. Prentice Hall Englewood Cliffs, NJ, 1989.

C. Schissler, C. Loftin, and D. Manocha. Acoustic classification and optimization for multi-modal rendering of real-world scenes. IEEE transactions on visualization and computer graphics, 24(3):1246-1259, 2017.

C. Schissler and D. Manocha. Interactive sound propagation and rendering for large multi-source scenes. ACM Transactions on Graphics (TOG), 36(1):2, 2017.

M. Schoeffler, F.-R. Stoter, B. Edler, and J. Herre. Towards the next generation of web-based experiments: A case study assessing basic audio quality following the itu-r recommenation bs. 1534 (mushra). In 1st Web Audio Conference, pp. 1-6, 2015.

P. Seetharaman and S. P. Tarzia. The hand clap as an impulse source for measuring room acoustics. In Audio Engineering Society Convention 132. Audio Engineering Society, 2012.

B. Series. Recommendation ITU-R BS. 1534-3 method for the subjective assessment of intermediate quality level of audio sytems. International Telecommunication Union Radio Communication Assembly, 2014.

P. Series. Methods for objective and subjective assessment of speech and video quality. International Telecommunication Union Radiocommunication Assembly, 2016.

J. Smith. Spectral Audio Signal Processing. Jan. 2008.

A. Sterling, N. Rewkowski, R. L. Klatzky, and M. C. Lin. Audio-material reconstruction for virtualized reality using a probabilistic damping model. IEEE transactions on visualization and computer graphics, 25(5):1855-1864, 2019.

A. Sterling, J. Wilson, S. Lowe, and M. C. Lin. Isnn: Impact sound neural network for audio-visual object classification. In Proceedings of the European Conference on Computer Vision (ECCV), pp. 555-572, 2018.

S. S. Stevens, J. Volkmann, E. B. Newman. A scale for the measurement of the psychological magnitude pitch. The Journal of the Acoustical Society of America, 8(3):185-190, 1937.

Z. Tang, J. Kanu, K. Hogan, and D. Manocha. Regression and classification for direction-of-arrival estimation with convolutional recurrent neural netowrks. In Interspeech, 2019.

M. Taylor, A. Chandak, Q. Mo, C. Lauterbach, C. Schissler, D. Manocha. Guided multiview ray tracing for fast auralization. IEEE Transactions on Visualization and Computer Graphics, 18:1797-1810, 2012.

I. R. Titze, L. M. Maxfield, and M. C. Walker. A formant range profile for singers. Journal of Voice, 31(3):382.e9-382.e13, 2017.

J. Traer and J. H. McDermott. Statistics of natural reverberation enable perceptual separation of sound and space. Proceedings of the National Academy of Sciences, 113(48):E7856-E7865.

N. Tsingos, T. Funkhouser, A. Ngan, and I. Carlbom. Modeling acoustics in virtual enviroments using the uniform theory of diffraction. In Proceedings of the 28th annual conference on Computer grahics and interactive techniques, pp. 545-552. ACM, 2001.

V. Valimaki and J. Reiss. All about audio equalization: Solutions and frontiers. Applied Sciences, 6(5):129, 2016.

T. Virtanen, M. D. Plumbley, and D. Ellis. Computational analysis of sound scenes and events. Springer, 2018.

M. Vorlander.Simulation of the transient and steady-state sound propagation in rooms using a new combined ray-tracing/image-source algorithm. The Journal of the Acoustical Society of America, 86(1):172-178, 1989.

H. Yeh, R. Mehra, Z. Ren, L. Antani, D. Manocha, and M. Lin. Wave-ray coupling for interactive sound propagation in large complex scenes. ACM Transactions of Graphics (TOG), 32(6):165, 2013.

S. Zhi, M. Bloesch, S. Leutenegger, and A. J. Davison. Scenecode: Monocular dense semantic reconstruction using learned encoded scene representations. In The IEEE Conference on Computer Vision and Pattern Recognition (CVPR), Jun. 2019.

C. Zhu, R. H. Byrd, P. Lu, and J. Nocedal. Algorithm 778: L-bfgs-b: Fortran subroutines for large-scale bound-constrained optimization. ACM Trans. Math. Softw., 23(4):550-560, Dec. 1997. doi: 10.1145/279232. 273236.

Germain, F. G., Mysore, G. J., & Fujioka, T. (Mar. 2016). Equalization matching of speech recordings in real-world environments. In 2016 IEEE International Conference on Acoustics, Speech and Signal Processing (ICASSP) (pp. 609-613). IEEE.

Schissler, C., Stirling, P., & Mehra, R. (Mar. 2017). Efficient construction of the spatial room impulse response. In 2017 IEEE Virtual Reality (VR) (pp. 122-130). IEEE.

U.S. Appl. No. 16/674,924, filed Sep. 11, 2020, Preinterview 1st Office Action.

U.S. Appl. No. 16/674,924, filed Dec. 7, 2020, Office Action.

U.S. Appl. No. 16/674,924, filed Apr. 12, 2021, Office Action.

U.S. Appl. No. 16/674,924, filed Jul. 21, 2021, Notice of Allowance.

* cited by examiner

GENERATING SCENE-AWARE AUDIO USING A NEURAL NETWORK-BASED ACOUSTIC ANALYSIS

CROSS-REFERENCE TO RELATED APPLICATIONS

The present application is a continuation of U.S. application Ser. No. 16/674,924, filed on Nov. 5, 2019. The aforementioned application is hereby incorporated by reference in its entirety.

BACKGROUND

Improvements to computer processing technologies have led to a recent increase in augmented and virtual reality applications. For example, many digital media systems utilize virtual or augmented reality to enhance various computing environments including educational applications, commercial applications, professional applications, and entertainment applications. Implementing virtual and augmented reality into such computing environments can improve interactivity, immersion, accuracy, and enjoyability of an experience. For example, some conventional systems can generate sounds within an augmented reality environment by re-producing digital audio from other user devices.

SUMMARY

One or more embodiments provide benefits and/or solve one or more of the foregoing or other problems in the art with systems, methods, and non-transitory computer readable storage media that render scene-aware audio in virtual/augmented reality environments using neural network-based acoustic analysis. To illustrate, the disclosed systems can provide an audio rendering of a digital character via an augmented reality device, such that the audio rendering accurately mimics the acoustic properties of the room and a virtual location of the digital character within the room. For example, in one or more embodiments, the disclosed systems utilize neural networks to predict acoustic properties of a user environment (e.g., a T60 value and an equalization frequency filter applicable to a room) based on an audio recording (e.g., a non-impulse response recording) captured within the user environment. The disclosed systems can use the acoustic properties of the user environment to determine material parameters of the user environment via an audio simulation. The disclosed systems can then use the acoustic properties and material parameters to generate a scene-aware audio sample for presentation within a virtual or augmented reality environment based on a user's surrounding environment.

Furthermore, in one or more embodiments, the disclosed systems can augment a training dataset of impulse responses for improved training of the neural networks. For instance, the disclosed systems can fit equalizations of measured impulse responses to normal distributions and randomly sample equalizations from the normal distributions. The disclosed systems can generate filters by comparing the randomly sampled equalizations to equalizations of existing impulse responses (e.g., synthetic impulse responses). The disclosed systems can then extend the training dataset by generating new impulse responses using the filters generated from the randomly sampled equalizations. The disclosed systems can thus improve the efficiency, accuracy, and flexibility of computing devices that render audio within virtual/augmented reality environments according to a user's environment.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
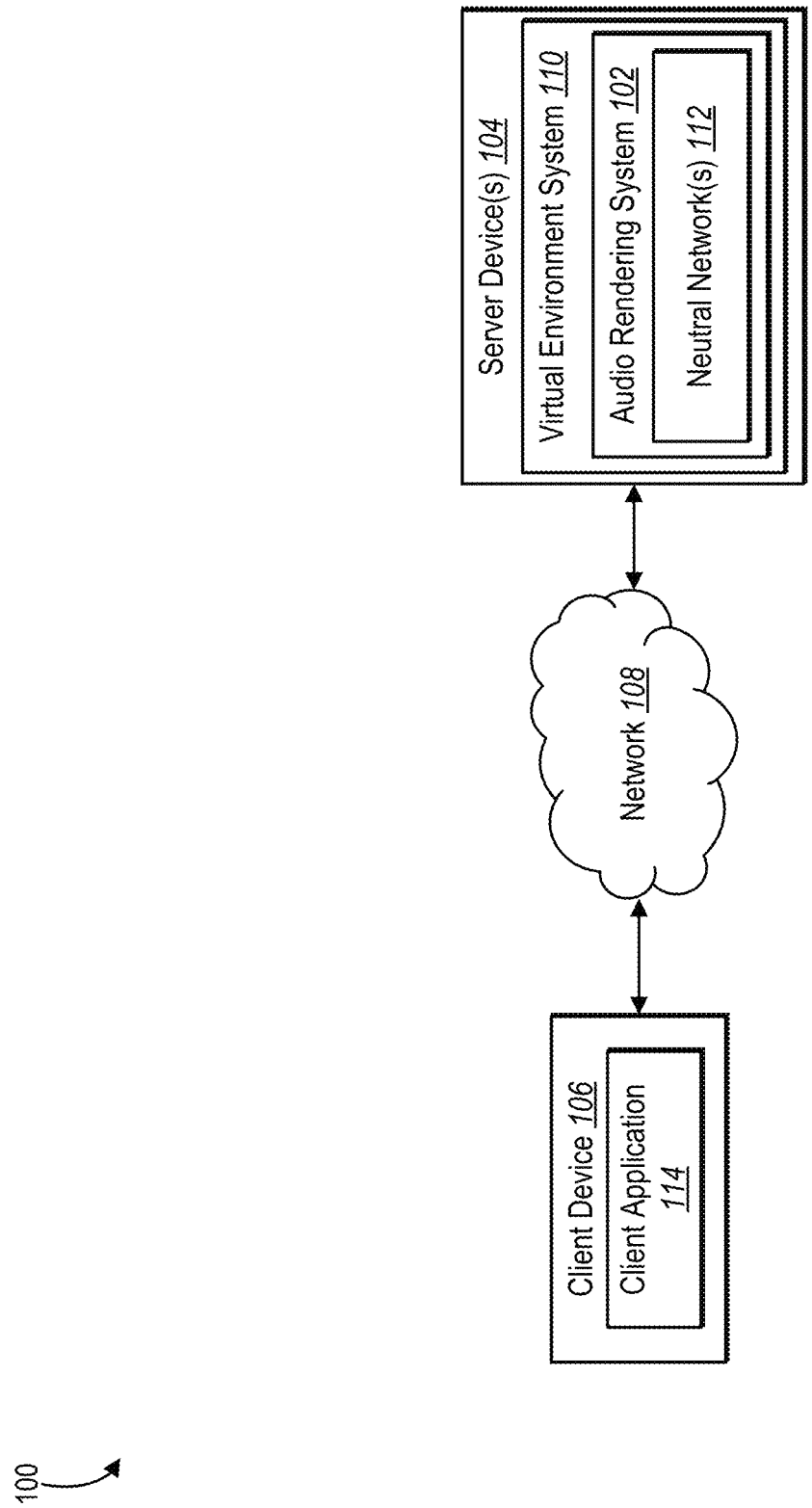
FIG. 1 illustrates an example system in which an audio rendering system can operate in accordance with one or more implementations.

One or more embodiments of the present disclosure include an audio rendering system that utilizes neural networks to predict acoustic properties of a user environment for rendering scene-aware audio within the user environment. In particular, the audio rendering system can avoid the complex and cumbersome testing procedures required to obtain an impulse response by utilizing an unobtrusive approach that works on in-situ speech recordings and video signals captured via commodity devices. For example, the audio rendering system can use neural networks to predict frequency-dependent environment equalizations and reverberation decay times of a user environment based on an audio recording within the environment. Specifically, in one or more embodiments, the audio rendering system predicts the acoustic properties using the neural networks using a recording within the user environment from a user device (e.g., a speech recording from a smartphone smartphone). The audio rendering system can use the predicted acoustic properties and an audio simulation model for the user environment to determine material parameters of the user environment. The audio rendering system can then use the material parameters and acoustic properties to generate an audio sample at a location within a virtual representation of the user environment. Thus, the audio rendering system can efficiently, flexibly, and accurately render scene-aware audio within a virtualization of a user environment using speech recordings from user devices and without the time-consuming and difficult process of capturing an impulse response.

For example, in one or more embodiments, the audio rendering system can identify an audio recording captured within a user environment. To illustrate, the audio recording can include a speech recording captured by a user device or from a video/audio recording that was captured within the user environment. Additionally, the audio rendering system can identify an estimated environment geometry of the user environment (e.g., by utilizing a video camera, a structure from motion algorithm, and/or an external application, device, or system). For instance, in some embodiments the estimated environment geometry includes a virtual representation such as a three-dimensional rendering of the user environment captured by the client device or another device.

The audio rendering system can use the audio recording and the estimated environment geometry to predict acoustic properties of the user environment. Specifically, the audio rendering system can analyze the audio recording using machine-learning to predict environment equalizations and reverberation decay times (e.g., a T60 value) for the user environment. To illustrate, the audio rendering system can use a first convolutional neural network to predict the environment equalizations and a second convolutional neural network to predict the reverberation decay times for a number of frequency sub-bands. Additionally, in one or more embodiments, the neural networks can have similar structures with the exception of the output layers corresponding to the frequency sub-bands of the outputs.

In addition to predicting environment equalizations and reverberation decay times for the user environment, the audio rendering system can estimate material properties of the user environment. In particular, the audio rendering system can perform an audio simulation for the user environment based on the identified estimated environment geometry. The audio rendering system can then adjust an energy curve for the audio simulation based on an energy curve corresponding to the predicted reverberation decay times for the user environment. Specifically, the audio rendering system can optimize material parameters utilizing an objective function that seeks to align a slope of the simulation energy curve to match (or be similar to) a target slope associated with the reverberation energy curve. The audio rendering system can thus optimize the material parameters (e.g., material absorption coefficients) at the same frequency sub-bands as the reverberation decay times to accurately determine the materials of the user environment.

Using the estimated material parameters and the predicted environment equalizations, the audio rendering system can then generate an audio sample that includes scene-aware information based on the user environment. For instance, the audio rendering system can modify a pre-recorded audio sample by applying an equalization filter based on the environment equalizations to the pre-recorded audio sample. Additionally, the audio rendering system can apply the environment material parameters to the pre-recorded audio sample such that the modified audio sample has an energy curve that reflects the reverberation decay times of the user environment. The audio rendering system can then process the generated/modified audio sample to place the audio sample at a specific location within the virtual representation of the user environment. The audio rendering system can thus provide audio that sounds as if the audio is occurring within the user environment.

In one or more embodiments, the audio rendering system can also augment a training dataset used to train the neural network(s) that predict acoustic properties of the user environment. In particular, the audio rendering system can use a training dataset including at least some measured impulse responses corresponding to a variety of user environments. The audio rendering system can fit equalization gains of the measured impulse responses to normal distributions and then randomly sample from the normal distributions. For instance, the audio rendering system can randomly sample from normal distributions corresponding to each of a set of frequency sub-bands to obtain a set of sampled values across the frequency sub-bands. The audio rendering system can also compare the sampled values to equalizations of a set of impulse responses (e.g., synthetic impulse responses) and then generate frequency filters to apply to the impulse responses and generate new synthetic impulse responses. By augmenting the training dataset in this manner, the audio rendering system can extend the training dataset to include more impulse responses, and therefore, improve the performance of the neural networks.

Conventional systems that render audio in virtual/augmented reality environments have a number of shortcomings in relation to efficiency, flexibility, and accuracy of operation. Specifically, to produce an accurate audio rendering that matches a target environment in which a user is located, some conventional systems require impulse responses captured within the user environment. Capturing impulse responses can be time-consuming and difficult due to using special recording hardware in specific conditions for recording the impulse responses. Additionally, if the position of either the source or listener of virtual/augmented audio changes within the user environment, these conventional systems must re-capture impulse responses, which is very inefficient.

Furthermore, conventional systems that rely on captured impulse responses for accurately rendering audio that reflects a target environment are also inflexible. In particular, because of the inefficiencies and difficulties involved with capturing impulse responses, the conventional systems are not useful for interactive applications that require (or allow) user movement within a user environment. Indeed, as a user moves within the user environment, recording additional impulse responses corresponding to the movement is not feasible in real-time, and introduces significant difficulty and time if done in advance.

Some conventional systems may not rely on impulse responses to render audio within a virtual or augmented reality environment and are thus inaccurate and inflexible. Instead, such conventional systems use synthetic environments and pre-determined/known acoustic properties of the synthetic environments for rendering audio. Because the rendered audio incorporates acoustic properties of the synthetic environments, the conventional systems produce audio that does not match the user environment in which a user experiencing the virtual/augmented reality environment is located. Rendered audio that does not match properties of a user environment results in degraded immersion and sense of presence for the user.

The disclosed audio rendering system can provide a number of advantages over conventional systems. For example, the audio rendering system can improve the efficiency, flexibility, and accuracy of computing systems that render audio within virtual or augmented reality environments. For instance, in contrast to conventional systems that rely on very limited sets of explicitly measured impulse responses, by using neural networks to predict environment acoustic properties based on simple audio recordings (e.g., speech recordings) using commodity devices (e.g., smartphones), the audio rendering system can generate accurate audio samples that reflect the properties of a user's current environment without needing an impulse response for the user environment. In addition, by using a unique objective function that focuses on aligning slope of an energy decay curve to a predicted reverberation decay time, the audio rendering system can perform optimization routines twice as fast as conventional systems. The audio rendering system can thus improve the efficiency of computing devices implementing virtual or augmented reality environments.

In addition to improving efficiency, the audio rendering system can improve the flexibility of computing devices implementing virtual/augmented reality environments. In particular, by eliminating the need to capture impulse responses and using neural networks to analyze simple audio recordings, the audio rendering system can provide scene-aware audio rendering for any user environment. To illustrate, because the only device needed is a computing device capable of capturing audio (e.g., speech), the audio rendering system can therefore predict the acoustic properties of a user environment quickly and efficiently and expand the feasible implementation of scene-aware audio rendering to any user environment without the use of special equipment or environment configurations. In addition, the audio rendering system can flexibly predict environment equalization and reverberation decay rates across a variety of different frequency sub-bands (in contrast to conventional systems that identify acoustic properties from impulse responses for full-band frequencies).

The audio rendering system also improves the accuracy of computing devices rendering audio for virtual/augmented reality environments. As an initial matter, the audio rendering system is the first to predict impulse response equalization from raw speech data (e.g., utilizing an equalization neural network). Moreover, the audio rendering system is able to accurately generate audio samples that reflect the acoustic properties of a user environment by using neural networks that predict the environment's acoustic properties. Indeed, the audio rendering system is not limited to generating audio samples for synthetic virtual environments, but rather is able to accurately portray sound that is not perceptually different from other sounds within a user environment.

In short, unlike all previous systems that require a clean impulse response recording for accurate estimation and optimization of boundary materials, the audio rendering system can infer material parameters, T60 values, and equalization from raw speech signals using a neural network model (e.g., a convolutional neural network).

As illustrated by the foregoing discussion, the present disclosure utilizes a variety of terms to describe features and advantages of the audio rendering system. Additional detail is now provided regarding the meaning of such terms. For example, as used herein, the term "neural network" refers to a computer representation that can be tuned (e.g., trained) based on inputs to approximate unknown functions. In particular, the term "neural network" can include a machine-learning model that utilizes algorithms to learn from, and make predictions on, known data by analyzing the known data to learn to generate outputs that reflect patterns and attributes of the known data. For instance, a neural network can include, but is not limited to, a convolutional neural network, a recurrent neural network, a generative adversarial neural network, or a graph neural network. A neural network makes high-level abstractions in data by generating data-driven predictions or decisions from the known input data. In one or more examples, a neural network can include, or be included in, a deep learning model that analyzes digital audio to generate predictions of acoustic properties of a user environment such as environment equalizations and reverberation decay times.

As used herein, the term "user environment" refers to a physical environment in which a user is located. For example, a user environment can include a room or other enclosed space in which a user is located. In additional embodiments a user environment can include a partially enclosed space or an open space. A user environment can also include a virtual reality environment, such as a virtual room or virtual space in which a user or avatar is located. As described herein, the audio rendering system can obtain information associated with a user environment (e.g., audio recording and environment geometry) to use in generating audio samples to be provided to a user client device within the user environment, such as within a virtual/augmented reality application in the user environment.

As used herein, the term "estimated environment geometry" refers to a digital representation of a user environment. In particular, an estimated environment geometry can include a digital environment or model that a computing device generates to represent a physical environment. In one or more embodiments, a computing device can generate an estimated environment geometry by analyzing video of a user environment (e.g., video captured by the computing device or by another computing device including a video capture device) and then reconstructing the user environment by determining dimensions, surfaces, and objects of the user environment. In additional embodiments, a system or user (e.g., a building architect associated with the environment) can provide manually measured geometry for the environment.

As used herein, the term "audio recording" refers to digital audio. For example, an audio recording can include a digital capture of speech occurring within a user environment. To illustrate a client device can capture audio within a user environment by using an audio capture device (e.g., a microphone) and software that generates an audio file for storing on the client device and/or providing to the audio rendering system for analysis using a neural network.

As used herein, the term "environment equalization" refers to a modification or alteration of an audio frequency energy amplitude corresponding to a user environment. For instance, an environmental equalization can include a frequency filter that reflects the resonances or diffraction effects of a room (e.g., a linear finite impulse response equalization filter). In particular, an environment equalization can indicate how a user environment relatively strengthens (e.g., boosts) or weakens (e.g., cuts) the energy of a specific frequency sub-band (or frequency range). For example, an environment equalization can indicate wave effects (e.g., relative modifications to particular frequency sub-bands) that geometric acoustic simulation algorithms may not take into account. Additionally, a user environment can affect the energy of audio differently at different frequency sub-bands. Accordingly, the audio rendering system can determine a plurality of frequency-dependent (or frequency-specific) environment equalizations across a plurality of frequency sub-bands (e.g., an equalization for each sub-band). Also as used herein, the term "frequency sub-band" refers to a subset of audio frequencies centered at a specific frequency. To illustrate a frequency sub-band can correspond to a subset of frequencies centered at 125 Hz, 1000 Hz, or 4000 Hz, etc., and covering a range of frequencies on both sides of the center frequency.

As used herein, the term "reverberation decay time" refers to a measurement that indicates the amount of time it takes for sound to decay a specified number of decibels below the original sound based on a user environment. For instance, a reverberation decay time can refer to a T60 measurement that indicates the amount of time (in seconds) it takes for sound to decay 60 dB. In other examples, a reverberation decay time can indicate the amount of time it takes for sound to decay another amount of decibels (e.g., 20 dB or 30 dB). Reverberation decay time may also correspond to a specific frequency sub-band, such that each frequency sub-band has a separate reverberation decay time for the user environment. Accordingly, the audio rendering system can also generate frequency-dependent (or frequency sub-band specific) reverberation decay times across a plurality of frequency sub-bands.

As used herein, the term "environment material parameter" refers to a metric indicating a property of a material of an object or surface that affects sound within a user environment. Specifically, an environment material parameter can include a material absorption coefficient that affects a reverberation decay time of sound within a user environment. For example, each object or surface can have a material with a specific material absorption coefficient that determines how much energy the object or surface absorbs over time. To illustrate, materials with high absorption rates can significantly impact the reverberation decay rates of the user environment as a whole.

As used herein, the term "audio sample" refers to a digital audio clip. For instance, an audio sample can include audio that the audio rendering system plays on a client device within a user environment. In one or more embodiments, the audio rendering system can generate an audio sample by modifying a pre-recorded or previously generated audio clip based on acoustic properties extracted for a user environment. Additionally, an audio sample can include new audio that the audio rendering system generates using a set of audio creation tools having certain acoustic properties to simulate sound in a user environment.

Additional detail will now be provided regarding the audio rendering system in relation to illustrative figures portraying exemplary implementations. To illustrate, FIG. 1 includes an embodiment of a system environment 100 in which an audio rendering system 102 operates. In particular, the system environment 100 includes server device(s) 104 and a client device 106 in communication via a network 108. Moreover, as shown, the server device(s) 104 includes a virtual environment system 110 including the audio rendering system 102. The audio rendering system 102 can further include neural network(s) 112. Additionally, the client device 106 can include a client application 114.

As shown in FIG. 1, the server device(s) 104 include the virtual environment system 110. The virtual environment system 110 can include, or be part of, one or more systems that implement virtual or augmented reality environments for one or more computing applications. For example, the virtual environment system 110 can implement virtual/augmented reality environments for presentation at various client devices (e.g., client device 106) including virtualized audio and visual media (e.g., video or images). To illustrate, the virtual environment system 110 can perform operations for implementing a virtual reality environment at a virtual reality device such as a virtual reality headset. Additionally, the virtual environment system 110 can perform operations for implementing an augmented reality environment at an augmented reality device such as an augmented reality headset or other user device capable of using augmented reality (e.g., smartphone, desktop, laptop, or tablet).

In connection with implementing virtual or augmented reality environments, the virtual environment system 110 can receive data from the client device 106 via the network 108 to use in establishing a virtual/augmented reality environment. For example, the client device 106 can provide information about a user environment in which the client device 106 is located (or will be located for a virtual/augmented reality presentation). In one or more embodiments, the client device 106 provides an audio recording and an estimated environment geometry to the virtual environment system 110 for implementing the virtual/augmented reality environment on the client device 106 or on another client device.

In response to receiving the data from the client device 106, the virtual environment system 110 can provide the received data to the audio rendering system 102 for rendering audio within the virtual/augmented reality environment. Specifically, the audio rendering system 102 can process the received data using the neural network(s) 112 to predict acoustic properties of the user environment. Additionally, the audio rendering system 102 can perform an audio simulation based on the user environment to optimize estimated properties of materials in the user environment. Based on the output(s) of the neural network(s) 112, the optimized material properties, and the estimated environmental geometry, the audio rendering system 102 can render audio for presenting within the user environment that sounds like it originated in the user environment.

The virtual environment system 110 can also incorporate additional media with rendered audio in a virtual/augmented reality environment. For instance, the virtual environment system 110 can generate or access visual media such as video or images (including images of text) to include with rendered audio. The virtual environment system 110 can then combine visual media with rendered audio to create a virtual/augmented environment and then provide the resulting data to the client device 106 for the client device 106 to present using the client application 114.

In one or more embodiments, the server device(s) 104 include a variety of computing devices, including those described below with reference to FIG. 12. For example, the server device(s) 104 can include one or more servers for storing and processing data associated with virtual/augmented reality applications. The server device(s) 104 can also include a plurality of computing devices in communication with each other, such as in a distributed storage environment. Furthermore, the server device(s) 104 can include devices and/or components in connection with one or more neural network(s) 112 and training data for training the neural networks. In some embodiments, the server device(s) 104 comprise a content server. The server device(s) 104 can also comprise an application server, a communication server, a web-hosting server, a social networking server, a digital content campaign server, or a digital communication management server.

As mentioned, the server device(s) 104 can include components associated with neural networks and training data for training the neural network(s) 112. In one or more embodiments, the server device(s) 104 (e.g., the audio rendering system 102 or another system) train the neural network(s) 112 using impulse responses captured within a variety of environments. The server device(s) 104 can also train the neural network(s) 112 using synthetic data (e.g., synthetically generated impulse responses) in the training dataset or in a separate training dataset. In addition to utilizing one or more training datasets, the server device(s) 104 can utilize a verification dataset and a testing dataset for verifying and testing training of the neural network(s) 112, respectively.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 12. Furthermore, although not shown in FIG. 1, the client device 106 can be operated by a user (e.g., a user included in, or associated with, the system environment 100) to perform a variety of functions. In particular, the client device 106 can perform functions such as, but not limited to, accessing, viewing, and interacting with a variety of digital content (e.g., digital images or audio within a virtual/augmented reality environment). The client device 106 can also perform functions for generating, capturing, or accessing data to provide to the virtual environment system 110 and the audio rendering system 102 in connection with virtual/augmented reality environments. For example, the client device 106 can communicate with the server device(s) 104 via the network 108 to provide information associated with audio recordings or estimated environment geometries. Although FIG. 1 illustrates the system environment 100 with a single client device 106, the system environment 100 can include a different number of client devices.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 12.

Although FIG. 1 illustrates the server device(s) 104 and the client device 106 communicating via the network 108, the various components of the systems 100 can communicate and/or interact via other methods (e.g., the server device(s) 104 and the client device 106 can communicate directly). Furthermore, although FIG. 1 illustrates the audio rendering system 102 being implemented by a particular component and/or device within the system environment 100, the audio rendering system 102 can be implemented, in whole or in part, by other computing devices and/or components in the system environment 100 (e.g., the client device 106).

Figure 2:
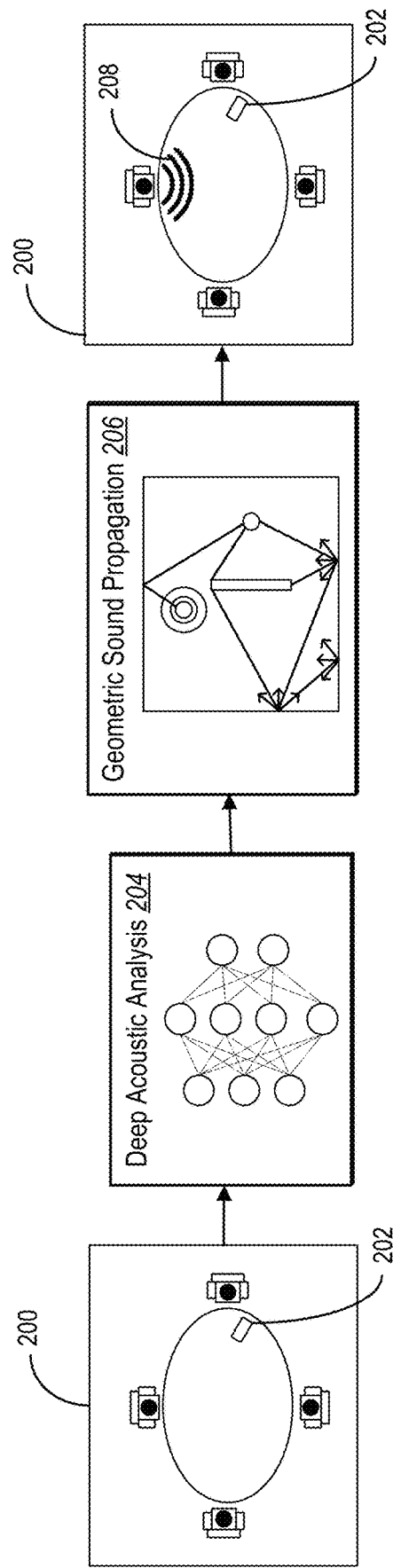
FIG. 2 illustrates a diagram of an overview of a process for rendering scene-aware audio in accordance with one or more implementations.

As mentioned above, the audio rendering system 102 can accurately render audio samples with characteristics that correspond to a user environment using neural networks and without recording an impulse response for the user environment. FIG. 2 illustrates, an overview of a process for rendering scene-aware audio according to a user environment 200. Specifically, FIG. 2 illustrates that the audio rendering system 102 can use information about the user environment 200 to generate audio samples incorporating the information about the user environment 200.

In one or more embodiments, as shown in FIG. 2, the user environment 200 includes a physical location in which a client device 202 is located. For example, the user environment 200 can include an enclosed room in which a smartphone or other device is located. Additionally, the client device 202 can include an audio input device to record audio within the user environment 200. To illustrate, a user of the client device 202 can utilize the client device 202 to record a short clip of speech within the user environment 200. Alternatively, the client device 202 can obtain an audio sample within the user environment 200 via another method such as from a video within the user environment 200 that also includes audio.

After the client device 202 captures or obtains audio within the user environment 200, the audio rendering system 102 can utilize deep acoustic analysis 204 of the audio recording to obtain information about the user environment 200. In particular, the audio rendering system 102 can use deep learning to analyze the audio recording to predict specific acoustic properties of the user environment 200. For example, in one or more embodiments described in more detail below, the audio rendering system predicts environment equalizations and reverberation decay times of the user environment 200 using separate convolutional neural networks to analyze the audio recording.

In response to using the deep acoustic analysis 204 to predict certain acoustic properties of the user environment 200, the audio rendering system 102 can then use geometric sound propagation 206 in combination with the predicted acoustic properties of the user environment 200 to generate plausible sound effects in a virtual model of the user environment 200. Specifically, the audio rendering system 102 can determine how the materials and configuration of the user environment 200 affect sound that originates within, or passes through, the user environment 200. For instance, the audio rendering system 102 can determine how each surface will affect sound waves that bounce off the surface (e.g., how much the sound is diminished by the surface). The audio rendering system 102 can also determine where to position an audio source and how the audio source will sound when presented to the user within a virtual/augmented reality environment.

FIG. 2 also shows that the audio rendering system 102 can then present a generated audio sample 208 having the acoustic properties determined according to the deep acoustic analysis 204 and the geometric sound propagation 206 within the user environment 200. In one or more embodiments, the audio rendering system 102 presents (e.g., plays) the audio sample 208 to the user within a virtual/augmented reality environment via the client device 202. Alternatively, the audio rendering system 102 can present the audio sample 208 within a virtual/augmented reality environment via a separate device associated with the user. In either case, by performing these operations, the audio rendering system 102 can make the audio sample 208 appear to originate from or nearby a specific location relative to the user within the user environment 200.

Figure 3:
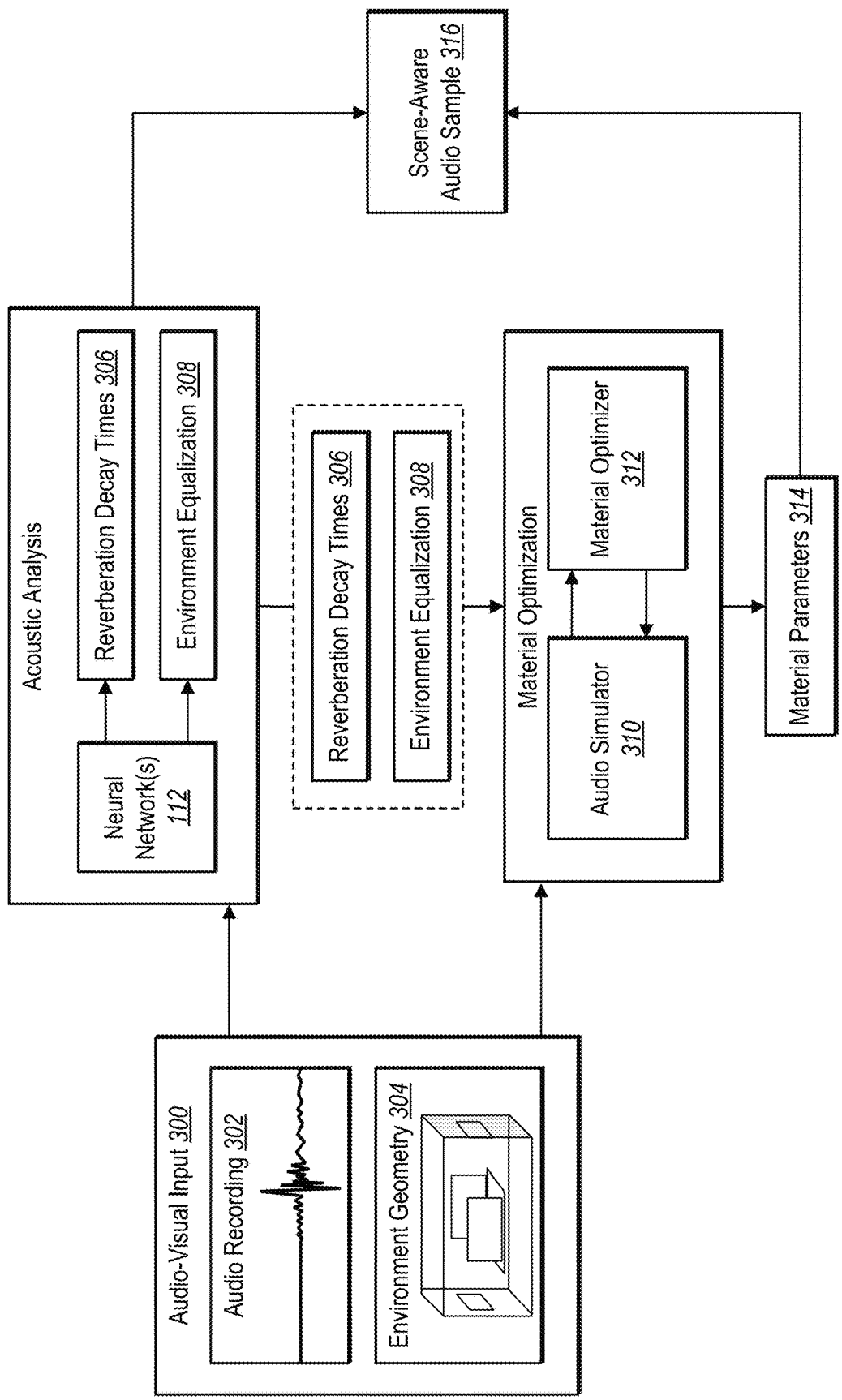
FIG. 3 illustrates a diagram of a detailed view of a process for rendering scene-aware audio in accordance with one or more implementations.

FIG. 3 illustrates a more detailed overview of a process for rendering scene-aware audio within a user environment. In particular, the audio rendering system 102 can communicate with a client device (e.g., client device 202 of FIG. 2) to obtain audio-visual input 300 that the audio rendering system 102 can use in determining acoustic properties of the user environment and in reconstructing the user environment within a virtual environment. For example, the audio rendering system 102 can identify an audio recording 302 including digitally recorded audio within the user environment (e.g., a speech recording). Additionally, the audio rendering system 102 can also identify an environment geometry 304 including a virtual representation of the user environment (e.g., by obtaining the environment geometry 304 from a video capture device utilizing a structure from motion algorithm or a third-party system).

In one or more embodiments, the audio rendering system 102 identifies a digital video (or a sequence of digital images) of a user environment and obtains both an environment geometry and a digital recorded audio from the digital video. For example, in one or more embodiments, the audio rendering system 102 utilizes a structure from motion algorithm or SLAM approach to generate a three-dimensional model (such as a three-dimensional point cloud) of an environment geometry based on a sequence of digital images of the user environment. To illustrate, in some embodiments, the audio rendering system 102 utilizes the process described by M. Bloesch, J. Czarnowski, R. Clark, S. Leutenegger, and A. J. Davison in Codeslam learning a compact, optimizable representation for dense visual slam, The IEEE Conference on Computer Vision and Pattern Recognition (CVPR), June 2018, which is incorporated by reference herein in its entirety. In some embodiments, the audio rendering system 102 utilizes alternate approaches, such as described by I. Bork in A comparison of room simulation software—the 2nd round robin on room acoustical computer simulation, Acta Acustica united with Acustica, 86(6):943-956 (2000), which is incorporated herein in its entirety by reference.

As illustrated in FIG. 3, the audio rendering system 102 can use the audio-visual input 300 to determine acoustic properties of the user environment using machine-learning and an audio simulation model. Specifically, in one or more embodiments, the audio rendering system 102 analyzes the audio recording 302 performs an acoustic analysis of the audio recording 302 to predict certain acoustic properties of the user environment. Additionally, in one or more embodiments, the audio rendering system 102 uses the environment geometry 304 in connection with predicted acoustic properties of the user environment from the acoustic analysis to perform material optimization of materials in the user environment.

For example, FIG. 3 illustrates that the audio rendering system 102 uses neural network(s) 112 to analyze the audio recording 302. In one or more embodiments, the audio rendering system 102 analyzes the audio recording 302 using a reverberation convolutional neural network to predict reverberation decay times 306 for the user environment. For instance, the audio rendering system 102 can train the reverberation convolutional neural network to predict reverberation decay times using a training dataset of impulse responses. The audio rendering system 102 can thus estimate reverberation decay times for the user environment based on a simple recording and without an impulse response for the user environment.

Furthermore, in one or more embodiments, the audio rendering system 102 analyzes the audio recording using an equalization convolutional neural network to predict environment equalizations 308 for the user environment. To illustrate, the audio rendering system 102 can train the equalization convolutional neural network to predict environment equalizations using a training dataset of impulse responses. The training dataset of impulse responses used to train the equalization convolutional neural network may be the same training dataset used to train the reverberation convolutional neural network. As with the reverberation decay times, the audio rendering system 102 can predict the environment equalizations based on a simple recording and without an impulse response for the user environment.

Once the audio rendering system 102 has predicted reverberation decay times 306 for the user environment, the audio rendering system 102 can use the predicted reverberation decay times 306 to determine materials in the user environment. In one or more embodiments, the audio rendering system 102 can also use the environment equalizations 308 to determine materials in the user environment. In particular, the audio rendering system 102 can utilize an inverse material optimization algorithm that uses an audio simulator 310 and a material optimizer 312 to estimate material parameters for materials in the user environment. For instance, the audio rendering system 102 can use the audio simulator 310 to create an audio simulation model that attempts to reproduce the paths that audio (e.g., sound energy waves) takes within the user environment. The audio rendering system 102 can also use the material optimizer 312 to optimize the parameters of the materials in the audio simulation model to correspond to the reverberation decay times 306 based on the audio recording 302. The audio rendering system 102 can then determine material parameters 314 for the user environment according to the environment geometry 304.

After performing the acoustic analysis and material optimization, the audio rendering system 102 can then generate a scene-aware audio sample 316 that incorporates the data output by the acoustic analysis and material optimization processes. In one or more embodiments, the audio rendering system 102 utilizes the environment equalizations 308, the material parameters 314, and the environment geometry 304 to generate at least one audio sample that has similar acoustic properties to other sounds occurring within the user environment. Additionally, the audio rendering system 102 can place the scene-aware audio sample 316 at a location within a virtual environment to make the audio sample 316 appear to originate at a specific location (or pass into the user environment at a specific point) within the user environment. By matching the acoustic properties of the audio sample 316 to audio occurring within the user environment, the audio rendering system 102 can provide a virtual/augmented reality that is realistic and immersive.

Figure 4:
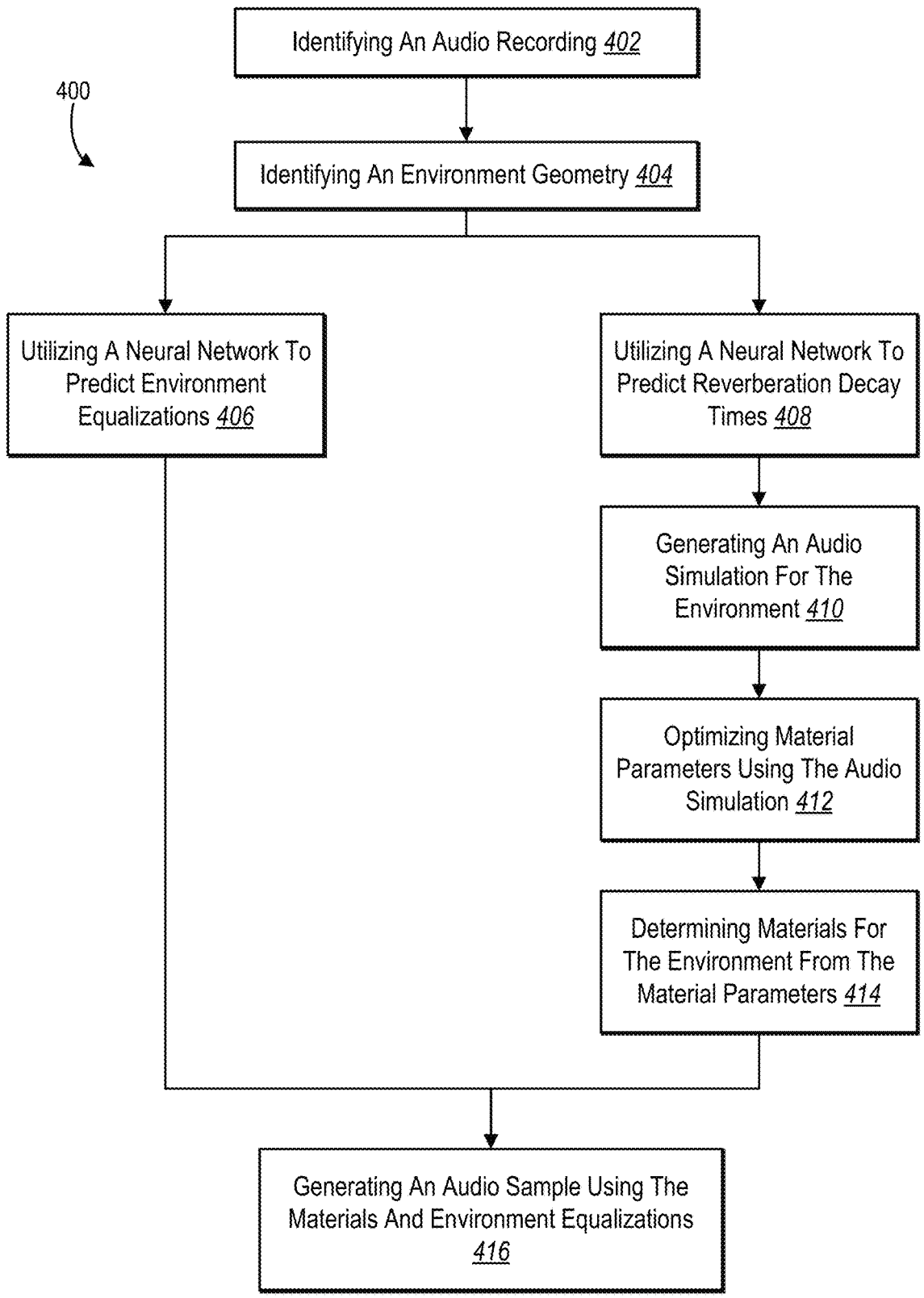
FIG. 4 illustrates a flowchart of a process for using neural networks to generate a scene-aware audio sample in accordance with one or more implementations.

FIG. 4 illustrates a flowchart of a series of acts 400 for using neural networks to generate a scene-aware audio sample. Specifically, the series of acts 400 includes operations that the audio rendering system 102 performs to render scene-aware audio within a virtual or augmented reality environment for presentation at a client device. While FIG. 4 illustrates that the series of acts 400 includes a specific set and order of operations for rendering scene-aware audio, the audio rendering system 102 may perform operations for rendering scene-aware audio using additional or fewer operations, or operations in a different order.

In one or more embodiments, FIG. 4 illustrates that the series of acts 400 includes an act 402 of identifying an audio recording. As briefly described previously, the audio rendering system 102 can obtain an audio recording within a user environment from a client device (e.g., a user client device such as a smartphone or other computing device capable of capturing a digital audio recording). For example, a client device of a user can record a short audio clip of speech (e.g., a four-second audio clip) and store the audio clip as an audio file.

Alternatively, the audio rendering system 102 can obtain the audio recording from another source, such as from another device or from a video clip captured within the user environment. To illustrate, the audio rendering system 102 can obtain a video file (e.g., from the client device of the user or from another device) including audio of speech within the user environment. The audio rendering system 102 can extract the audio from the video file and store the audio in a separate audio file.

In one or more embodiments, before, after, or in connection with identifying an audio recording, FIG. 4 illustrates that the series of acts 400 includes an act 404 of identifying an environment geometry for the user environment. For instance, the audio rendering system 102 can obtain a virtual representation of the user environment that includes information about the geometry of the user environment. In one or more embodiments, the audio rendering system 102 (or a client device in communication with the audio rendering system 102) can generate the environment geometry utilizing an application that analyzes camera or video input to create an accurate environment geometry. The environment geometry includes spatial information that the audio rendering system 102 can use to determine relative locations of surfaces and objects within the user environment.

FIG. 4 illustrates that the series of acts 400 also includes an act 406 of utilizing a neural network to predict environment equalizations for the user environment. Specifically, as previously mentioned, the audio rendering system 102 can use an equalization convolutional neural network to predict environment equalizations from the audio recording. For example, the equalization convolutional neural network can output predictions of environment equalizations of the user environment for a set of frequency sub-bands because of the potential for different effects of the user environment and materials on different sound frequencies. To illustrate, the audio rendering system 102 can generate predicted environment equalizations for six sub-bands centered at {62.5, 125, 250, 500, 2000, 4000}Hz, with each equalization being relative to the 1 kHz sub-band. Each environment equalization can correspond to a specific frequency sub-band indicating a strengthening or weakening effect that the user environment has on frequencies at the corresponding sub-band.

In one or more embodiments, the audio rendering system 102 generates an equalization filter corresponding to the predicted environment equalizations. The audio rendering system 102 can use the equalization filter to generate or modify audio samples according to the environment equalizations. Additionally, in at least some instances, the audio rendering system 102 can set sub-bands of the filter that do not correspond to a specific predicted equalization (e.g., sub-bands greater than 8000 Hz) to a specific energy value (e.g., −50 dB). This can limit the impact of the frequencies outside the predicted range on the overall equalization filter and resulting audio samples.

Additionally, FIG. 4 illustrates that the series of acts 400 includes an act 408 of utilizing a neural network to predict reverberation decay times for the user environment. In particular, the audio rendering system 102 can use a reverberation convolutional neural network to predict reverberation decay times from the audio recording. To illustrate, the reverberation convolutional neural network can output predictions of reverberation decay times of the user environment for a set of frequency sub-bands. For example, the audio rendering system 102 can generate predicted reverberation decay times for seven sub-bands centered at {125, 250, 500, 1000, 2000, 4000, 8000}Hz. The predictions of reverberation decay times thus indicate the amount of time sound at each frequency sub-band takes to decay a given amount (e.g., 60 dB) within the user environment.

As shown, the frequency sub-bands associated with the reverberation decay times may include one or more sub-bands in common with the frequency sub-bands of the environment equalizations and/or one or more sub-bands different than the frequency sub-bands of the environment equalizations. Additionally, while the above description indicates specific sets of frequency sub-bands for the environment equalizations and the reverberation decay times, the audio rendering system 102 may use the neural networks to output predictions at different sets (and numbers) of frequency sub-bands than described above. Furthermore, the audio rendering system 102 may determine whether the outputs for one or more sub-bands are unreliable due to low signal-to-noise ratio, for instance. Accordingly, in some circumstances, the audio rendering system 102 can automatically set environment equalizations or reverberation decay times for unreliable frequency sub-bands to values of a nearby, reliable sub-band (e.g., setting the reverberation decay time at 62.5 Hz to the same value as the reverberation decay time at 125 Hz).

Accordingly, as shown in the acts 406 and 408, the audio rendering system 102 can predict, for a user environment, a plurality of environment equalizations for a first set of frequency sub-bands; and predict, for the user environment, a plurality of reverberation decay times for a second set of frequency sub-bands.

After predicting the reverberation decay times of the user environment for a plurality of frequency sub-bands, FIG. 4 illustrates that the series of acts 400 includes an act 410 of generating an audio simulation model for the environment. Specifically, the audio rendering system 102 can perform an audio simulation model that simulates the paths of sound based on the environment geometry for the user environment. More specifically, the audio simulation model can use ray tracing techniques to simulate the paths of the sound by generating a set of sound paths and then tracking whether each sound path reaches a listener location and how long each sound path takes to reach the listener location. The audio rendering system 102 can take into account how much sound each surface absorbs upon reflecting the sound based on the absorption coefficients of the materials.

Figure 5:
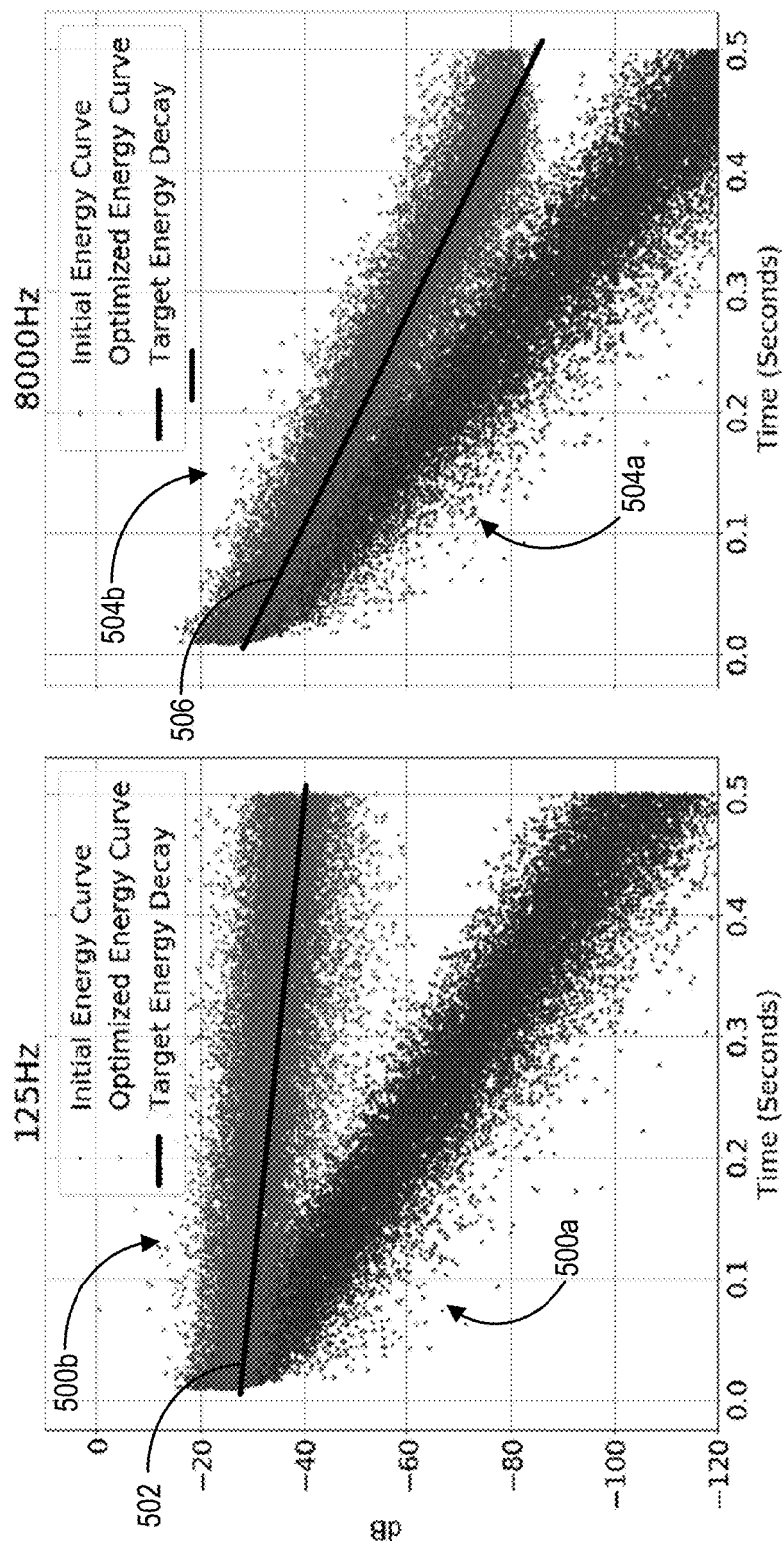
FIG. 5 illustrates chart diagrams of energy curves for a plurality of frequency bands in accordance with one or more implementations.

FIG. 4 illustrates that the series of acts 400 also includes an act 412 of optimizing material parameters using the audio simulation model. In particular, the audio rendering system 102 can optimize absorption coefficients of the materials in the user environment, as determined from the audio simulation model, based on the predicted reverberation decay times from the corresponding neural network. For instance, the audio rendering system can modify absorption coefficients such that the energy distributions (e.g., energy curves) of paths in the audio simulation model match (e.g., are similar to) energy distributions based on the predicted reverberation decay times. More particularly, the audio rendering system 102 can modify a slope of a given energy curve at a frequency sub-band for the audio simulation model to match a target slope for an energy curve corresponding to the reverberation decay time at the same frequency sub-band. Thus, the audio rendering system 102 can ensure that the energy decay of the virtualized environment used in the audio simulation model matches the energy decay of the user environment. FIG. 5 below, and the accompanying description, provide additional detail related to the optimization of material parameters.

In connection with optimizing the material parameters, FIG. 4 illustrates that the series of acts 400 includes the act 414 of determining materials for the environment from the material parameters. For instance, the audio rendering system 102 can determine a material for one or more surfaces or objects based on the optimized material parameters. According to at least some embodiments, the audio rendering system 102 can use a set of initial materials for the audio simulation model of the user environment according to the environment geometry. The audio rendering system 102 can then update the materials in accordance with the optimization of the material parameters so that the updated materials have properties that cause the properties of the audio simulation model to match the properties of the user environment based on the audio recording. For example, the audio rendering system 102 can set a material of a given surface to be brick, carpet, glass, metal, wood, plastic, etc., based on the determined material parameters for the surface.

After optimizing the material parameters for the user environment, FIG. 4 illustrates that the series of acts 400 includes an act 416 of generating an audio sample using the materials and environment equalizations. In particular, the audio rendering system 102 can use the acoustic properties and other information that the audio rendering system 102 has collected/generated for the user environment to generate an audio sample to present within a virtual/augmented reality environment via a client device. To illustrate, the audio rendering system 102 can use the determined properties to modify a pre-recorded audio sample or generate a new audio sample so that the reverberation decay times and equalizations of the audio sample match the reverberation decay times and equalizations of audio within the user environment. For example, the audio rendering system 102 can modify a pre-recorded audio sample so that the audio sample has an amplitude waveform with a decay amplitude and tail shape similar to other audio within the user environment. Thus, the resulting audio sample in the virtual/augmented reality environment can have a similar sound to the other audio originating within the user environment.

In addition to generating an audio sample that has acoustic properties that are based on the acoustic properties of the environment, the audio rendering system 102 can also use information about the environment geometry to cause the audio sample to originate at a specific location within the virtualized environment. For instance, in an embodiment in which the user environment is a conference room, the audio rendering system 102 can generate an audio sample that originates from a virtual character sitting in a chair in an augmented reality environment corresponding to the conference room. The audio rendering system 102 can use virtualization to make the audio sample sound like it's coming from a specific direction and distance from a listener location. The audio rendering system 102 can also make the audio sample sound as if the audio sample is happening within the conference room such that the audio sample blends with other sounds in the conference room. For example, the audio rendering system 102 can use the principles described by A. Rungta, C. Schissler, N. Rewkowski, R. Mehra, and D. Manocha in Diffraction kernels for interactive sound propagation in dynamic environments, IEEE transactions on visualization and computer graphics, 24(4):1613-1622, 2018, or H. Yeh, R. Mehra, Z. Ren, L. Antani, D. Manocha, and M. Lin in Wave-ray coupling for interactive sound propagation in large complex scenes, ACM Transactions on Graphics (TOG), 32(6):165, 2013, which are hereby incorporated in their entirety, to place audio samples at specific locations within virtual environments and accurately propagate the sound through the virtual environments.

In another example, the audio rendering system 102 can analyze video recorded in an environment to determine acoustics for the environment. In particular, the audio rendering system 102 can analyze noisy, reverberant audio from the video to determine the acoustic properties of the environment including environment equalizations and reverberation decay times for sets of frequency sub-bands. Additionally, the audio rendering system 102 can estimate an environment geometry from the video. The audio rendering system 102 can then simulate sound that is similar to the recorded sound in the environment of the video and add the sound to the video. Thus, the audio rendering system 102 can simulate sound for an environment even without direct access to the environment.

As mentioned briefly above, the audio rendering system 102 can optimize material properties for a user environment based on an audio simulation model and predicted reverberation decay times for the user environment. FIG. 5 illustrates graph diagrams of energy curves associated with an audio simulation model for a user environment. In particular, FIG. 5 illustrates energy curves at different frequency sub-bands before and after optimization of the material parameters.

For example, FIG. 5 illustrates simulation energy curves corresponding to a first frequency sub-band. As shown, the first frequency sub-band corresponds to a sub-band centered at 125 Hz. FIG. 5 illustrates a first simulation energy curve 500a corresponding to an unoptimized energy curve from an audio simulation model for a user environment. Additionally, FIG. 5 illustrates a target slope 502 corresponding to an energy curve based on a reverberation decay time for the user environment.

In one or more embodiments, the audio rendering system 102 optimizes the material parameters for the user environment at the first frequency sub-band by adjusting a slop of the first simulation energy curve 500a to match a target slope 502. This results in a second simulation energy curve 500b that has a slope matching the target slope 502. Modifying the slope of the first simulation energy curve 500a to create the second simulation energy curve 500b by modifying the material parameters causes the second simulation energy curve 500b to have decay similar to an energy decay of the user environment.

As noted previously, the audio rendering system 102 can perform material optimization for each of a plurality of frequency sub-bands independently from each other. Accordingly, FIG. 5 also illustrates simulation energy curves 504a, 504b and a target slope 506 for a second frequency sub-band centered at 8000 Hz. Because the user environment associated with FIG. 5 causes different effects on sound at the first frequency sub-band centered at 125 Hz and at the second frequency sub-band centered at 8000 Hz, the energy curves for the user environment based on the reverberation decay times at those frequency sub-bands are different. In particular, FIG. 5 illustrates that the reverberation decay time is shorter at the 8000 Hz sub-band than at the 125 Hz sub-band. Accordingly, the audio rendering system 102 may need to modify the corresponding energy curves for the audio simulation model different amounts at each frequency sub-band.

In one or more embodiments, the audio rendering system 102 performs the optimization of materials using an objective function that allows the audio rendering system 102 to efficiently optimize the material parameters. Indeed, as mentioned above, the audio rendering system 102 can utilize an objective function that reduces a difference between a first slope of an audio simulation energy curve (determined based on the audio simulation model) and a second slope of a reverberation energy curve based on a predicted reverberation decay time. In one or more embodiments, for example, the audio rendering system 102 can generate an audio simulation model by first generating a set of sound paths, each of which carries an amount of sound energy. Additionally, each material $m_i$ in a scene can be represented by a frequency dependent absorption coefficient $\rho_i$. The audio simulation model can simulate that a set of materials can reflect a sound path leaving a source before reaching a listener. The energy fraction received by the listener along path j is $$e_j = \beta_j \prod_{k=1}^{N_j} \rho_{m^k}.$$

where $m^k$ is the material the path intersects on the $k^{th}$ bounce, $N_j$ is the number of surface reflections for path j, and $\beta_j$ accounts for air absorption (dependent on the total length of the path). The audio rendering system 102 can optimize the set of absorption coefficients $\rho_1$ to match the energy distribution of the paths $e_j$ to that of the environments impulse response (as reconstructed based on the predicted reverberation decay times and environment equalizations). In one or more embodiments, the audio rendering system may assume the energy decrease of the impulse response follows an exponential curve, which is a linear decay in the dB space. The slope of the decay line is $m'=-60/T_{60}$ where $T_{60}$ is the reverberation decay time for the energy to decay 60 dB.

In one or more embodiments, the audio rendering system 102 uses an objective function $$J(\rho)=(m-m')^2$$

where m is the best fit line of the ray energies on a decibel scale:

$$m = \frac{n\sum_{i=0}^{n} t_i y_i - \sum_{i=0}^{n} t_i \sum_{i=0}^{n} y_i}{n\sum_{i=0}^{n} t_i^2 - \left(\sum_{i=0}^{n} t_i\right)^2}$$

with $y_i=10 \log_{10}(e_i)$. In particular, the audio rendering system 102 can use the objective function to focus on the energy decrease of audio based on the material properties. For example, the audio rendering system 102 can allow the absolute scale of the values from an audio simulation move while optimizing only the slope of the best fit line of the ray energies. This can result in a better match to the target slope of the reverberation decay time for the frequency sub-band. In one or more embodiments, the audio rendering system 102 also minimizes J using an optimization algorithm (e.g., limited-memory Broyden-Fletcher-Goldfarb-Shanno-B or "L-BFGS-B" algorithm). Furthermore, a gradient of J can be represented by $$\frac{\partial J}{\partial \rho_j} = 2(m-m')\frac{nt_i - \sum_{i=0}^{n} t_i}{n\sum_{i=0}^{n} t_i^2 - \left(\sum_{i=0}^{n} t_i\right)^2} \frac{10}{10\log_{10} e_i} \frac{\partial e_i}{\partial \rho_j}$$

As described in relation to FIGS. 4 and 5, the audio rendering system 102 can perform operations for analyzing an audio recording using neural networks to predict acoustic properties for a user environment. The operations allow the audio rendering system 102 to accurately simulate audio within a virtualization of the user environment and then generate audio samples that have characteristics reflecting the acoustic properties of the user environment. Accordingly, the acts and operations illustrated and described above in relation to FIGS. 3-5 5 can provide the corresponding acts (e.g., structure) for a step for utilizing a neural network and an audio simulation model to predict an environment equalization, a reverberation decay time, and environment material parameters from the audio recording.

Figure 6:
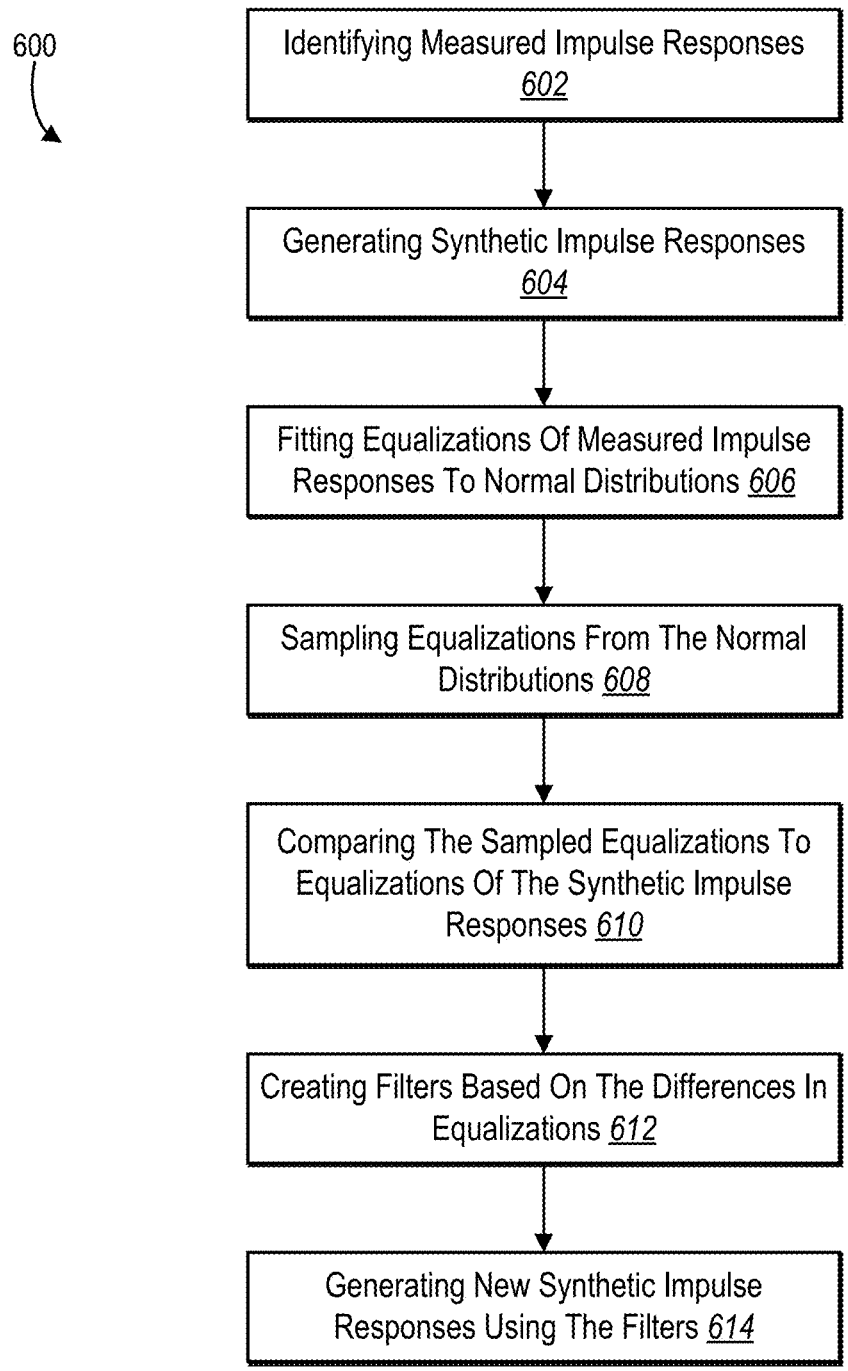
FIG. 6 illustrates a flowchart of a process for augmenting a training dataset with synthetic impulse responses in accordance with one or more implementations.

As described previously, the audio rendering system 102 can also train neural networks to predict acoustic properties of a user environment from simple audio recordings. Additionally, the audio rendering system 102 can augment a training dataset (or a validation dataset) based on the acoustic properties of measured impulse responses to increase the utility of the training dataset. FIG. 6 illustrates a diagram detailing a series of acts 600 for augmenting a training dataset by generating synthetic impulse responses using information about individual sub-bands of measured impulse responses. In particular, FIG. 6 illustrates that the audio rendering system 102 can use equalization data from a plurality of impulse responses to augment a training dataset.

As illustrated in FIG. 6, the series of acts 600 includes an act 602 of identifying measured impulse responses. Specifically, the audio rendering system 102 can access one or more sets of impulse responses that have been captured within a variety of environments using specialized equipment and environment configurations. Because such datasets tend to be small, however, the audio rendering system 102 can augment the training dataset with synthetic data to increase the data points that the audio rendering system 102 can use in training neural networks. For instance, in one or more embodiments, the audio rendering system 102 uses impulse responses and speech data from ACE Challenge impulse responses (i.e., 70 impulse responses and noise audio), MIT IR survey (271 impulse responses), and DAPS dataset (4.5 hours of 20 speakers' speech—10 males and 10 females) to train a reverberation convolutional neural network and an equalization convolutional neural network.

In addition to identifying measured impulse responses, FIG. 6 illustrates that the series of acts 600 includes an act 604 of generating synthetic impulse responses to augment the training dataset. In particular, because of the limited size of the dataset(s) of measured impulse responses, the audio rendering system 102 can perform an initial augmentation of generating synthetic impulse responses. For example, the audio rendering system 102 can expand the reverberation decay times and direct-to-reverberant ratio range of a set of measured impulse responses, resulting in a large number of synthetic impulse responses with a balanced reverberation decay time distribution (e.g., between 0.1~0.5 seconds), as described by N. J. Bryan in Impulse response data augmentation and deep neural networks for blind room acoustic parameter estimation. arXiv preprint arXiv:1909.03642 (2019), which is incorporated by reference herein in its entirety. The audio rendering system 102 can compute ground truth reverberation decay time estimates directly from measured impulse responses in a variety of ways (e.g., according to the methods described in M. Karjalainen, P. Antsalo, A. Makivirta, T. Peltonen, and V. Valimaki. Estimation of model decay parameters from noisy response measurements. In Audio Engineering Society Convention 110. Audio Engineering Society, 2001).

In one or more embodiments, the audio rendering system 102 augments the equalizations of the training dataset(s) using information about equalizations of the measured impulse responses. FIG. 6 illustrates that the series of acts 600 includes an act 606 of fitting equalizations of measured impulse responses to normal distributions. More specifically, the audio rendering system 102 can analyze equalizations within each frequency sub-band (e.g., by extracting the original equalizations of the measured impulse responses) to determine mean and standard deviation of impulse response equalization amplitudes/gains within each sub-band. For instance, FIG. 8A below illustrates an example of fitting equalization gains to normal distributions according to a set of frequency sub-bands.

Once the audio rendering system 102 has fit the equalization gains of the impulse responses to normal distributions, FIG. 6 illustrates that the series of acts 600 includes an act 608 of sampling equalizations from the normal distributions. For example, the audio rendering system 102 can randomly sample a target equalization corresponding to a frequency sub-band from the normal distribution at the frequency sub-band. The audio rendering system 102 can also randomly sample target equalizations from each of the other normal distributions independently per frequency sub-band to obtain a plurality of sampled target equalization across the plurality of sub-bands. To illustrate, by randomly sampling from each sub-band independently, the audio rendering system 102 can obtain a plurality of equalizations that correspond to different measured impulse responses across the different frequency sub-bands.

FIG. 6 also illustrates that the series of acts 600 includes an act 610 of comparing the sampled equalizations to equalizations of the synthetic impulse responses. In particular, the audio rendering system 102 can calculate, for each of a plurality of synthetic impulse responses, a distance between the source equalizations (equalizations corresponding to a given synthetic impulse response) and the target equalizations (randomly sampled equalizations). For instance, the audio rendering system 102 can calculate a distance between an equalization of a synthetic impulse response at a first frequency sub-band (e.g., 4000 Hz) and a randomly sampled equalization at the first frequency sub-band.

Once the audio rendering system 102 has compared the source and target equalizations, FIG. 6 illustrates that the series of acts 600 includes an act 612 of creating filters based on the differences in equalizations. Specifically, for a given synthetic impulse response, the audio rendering system 102 can create a filter based on the difference between the synthetic impulse response and the corresponding randomly sampled equalizations at a plurality of frequency sub-bands. Additionally, in one or more embodiments, the audio rendering system 102 generates a finite impulse response filter ("FIR filter") to compensate for the calculated difference. According to one or more embodiments, the audio rendering system 102 can use a window method for designing the filter to simplify the creation of the filter. The audio rendering system 102 can likewise generate a filter for each of the synthetic impulse responses compared to randomly sampled equalizations.

FIG. 6 illustrates that the series of acts 600 also includes an act 614 of generating new synthetic impulse responses using the filters. For example, the audio rendering system 102 can apply a generated filter to a synthetic impulse response to create a new impulse response based on the difference between the synthetic impulse response and the randomly sampled equalizations. Applying the filters to the synthetic impulse responses provides an efficient way to extend the training dataset while also causing the new synthetic impulse responses to have properties that are similar to the properties of the measured impulse responses. FIGS. 8B-8C and the accompanying description provide additional detail with regard to generating new synthetic impulse responses based on measured impulse responses.

In some embodiments, the audio rendering system 102 computes the log Mel-frequency spectrogram for a plurality of four second audio clips. The audio rendering system 102 can utilize a Hann window of size 256 with 50% overlap during computation of a short-time Fourier transform (STFT) four 16 kHz samples. Then, the audio rendering system 102 can utilize 32 Mel-scale bands and area normalization for Mel-frequency warping (the spectrogram power computed in decibels). This extraction process yields a 32×499 (frequency×time domain) matrix feature representation. The audio rendering system 102 can normalize the feature matrices by the mean and standard deviation of the training set.

Optionally, the audio rendering system 102 can establish certain parameters for randomly sampling the equalizations for comparing to the synthetic impulse responses. To illustrate, the audio rendering system 102 can intentionally sample equalizations so that the new synthetic impulse responses have different statistical distributions than the measured impulse responses. For example, the audio rendering system 102 can increase the variance in the normal distributions of measured impulse response. By using a larger variance, the audio rendering system 102 can increase the variety of training data, which can improve training of the neural networks to account for additional scenarios that are not included in small training datasets of measured impulse responses.

To illustrate, the audio rendering system 102 can determine a normal distribution having an initial variance (e.g., an initial standard deviation from a mean). The audio rendering system can generate a modified normal distribution by increasing the initial variance to a target variance. For instance, the audio rendering system can modify the initial standard deviation to a larger, target standard deviation, resulting in a modified normal distribution. The audio rendering system 102 can then sample equalizations from the modified normal distribution to generate a set of equalizations with a larger variance.

Upon generating synthetic impulse responses, the audio rendering system 102 can utilize the synthetic impulse responses to train a neural network. Indeed, the audio rendering system 102 utilize the synthetic impulse responses in combination with audio recordings to generate training recordings (e.g., speech audio recordings) that reflect particular environment equalizations and reverberation decay rates.

Figure 7:
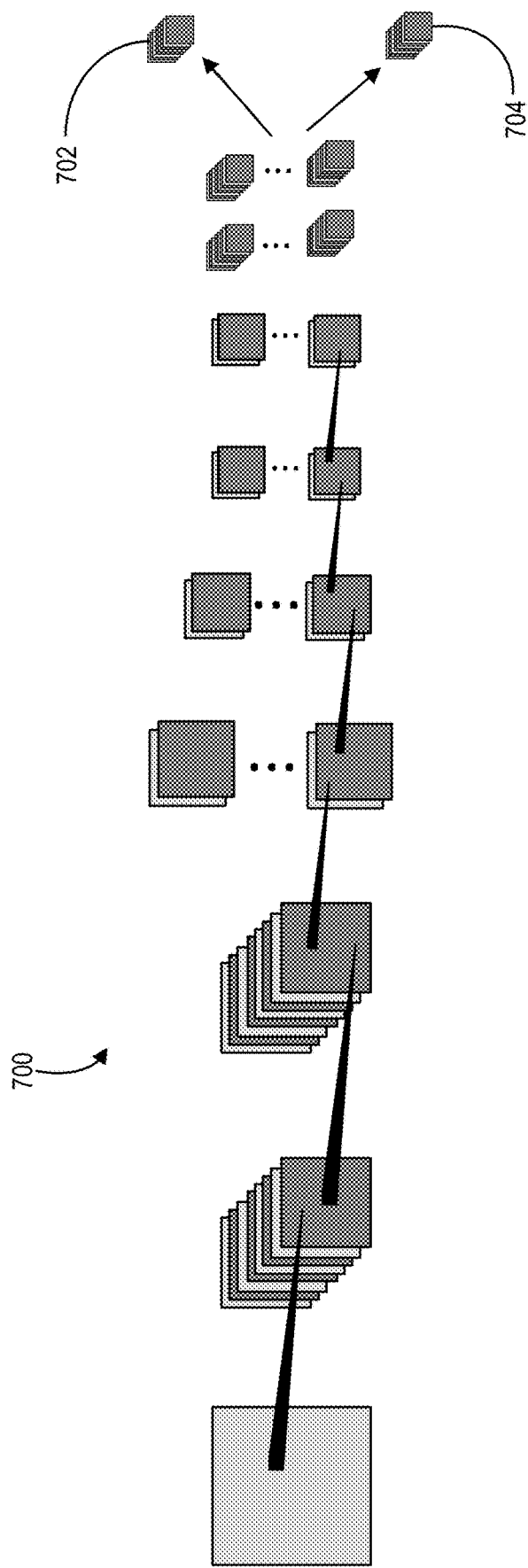
FIG. 7 illustrates a diagram of an embodiment of a neural network structure for predicting acoustic properties of an environment in accordance with one or more implementations.

FIG. 7 illustrates an embodiment of a neural network structure 700 that the audio rendering system 102 can use to predict acoustic properties of a user environment based on an audio recording input. As shown, the audio rendering system 102 can use the same neural network structure 700 for each of the neural networks that the audio rendering system 102 utilizes to predict environment equalizations and reverberation decay times. In particular, the audio rendering system 102 can train two separate neural networks having the neural network structure 700 with the exception of the final output layer, which is dependent on the specific set of frequency sub-bands corresponding to each acoustic property. To illustrate, the audio rendering system 102 can use a first convolutional neural network having the neural network structure 700 with a first output layer 702 based on the specific set of frequency sub-bands for environment equalizations (e.g., six outputs from 62.5 Hz to 4000 Hz sub-bands and excluding a 1 kHz sub-band). The audio rendering system 102 can also use a second convolutional neural network having the neural network structure 700 with a second output layer 704 based on the set of frequency sub-bands for reverberation decay times (e.g., seven outputs from 125 Hz to 8000 Hz sub-bands and including a 1 kHz sub-band).

The audio rendering system 102 can utilize a variety of neural network architectures in relation to the neural networking structure 700. To illustrate, in relation to the embodiment of FIG. 7, the audio rendering system 102 utilizes six 2D convolutional layers sequentially to reduce both time and frequency resolution of features until they have approximately the same dimension. Each convolutional layer is followed by a rectified linear unit (ReLU) activation function, 2D max pooling, and batch normalization. The output from the convolutional layers is flatted to a 1D vector and connected to a fully connected layer of 64 units, at a dropout rate of 50% to lower the risk of overfitting. The final output layer has 7 fully connected units to predict a vector of length 7 for T60 or 6 fully connected units to predict a vector of length 6 for frequency equalization. The audio rendering system 102 can utilize different layers, dropout rates, or other architectural features in different embodiments.

The audio rendering system 102 can also train a neural network (such as the neural network architecture 700). In particular, the audio rendering system 102 can utilize training data sets (such as the augmented training data described in relation to FIG. 6) to train the neural network. Specifically, the audio rendering system 102 can access or generate training audio recordings from training impulse responses (e.g., generate training speech recordings by convolving speech recordings with training impulse responses). The audio rendering system 102 can feed the training audio recordings to the neural network. The neural network can analyze the training audio recordings and generate predicted environment equalizations and/or predicted reverberation decay rates.

The audio rendering system 102 can train the neural network by comparing the predicted environment equalizations and/or predicted reverberation decay rates with ground truth measurements (e.g., ground truth equalizations and/or ground truth reverberation decay rates from the training impulse responses). Specifically, the audio rendering system 102 can apply a loss function to determine a measure of loss between the predicted acoustic properties and the ground truth. The audio rendering system 102 can then modify internal parameters of the neural network based on the measure of loss by utilizing back-propagation techniques. To illustrate, in one or more embodiments, the audio rendering system 102 utilizes the mean square error (MSE) loss with an Adam optimizer, as described by D. Kingma, J. Ba in Adam: a method for stochastic optimization, 3rd International Conference on Learning Representations, ICLR 2015.

Figure 8A:
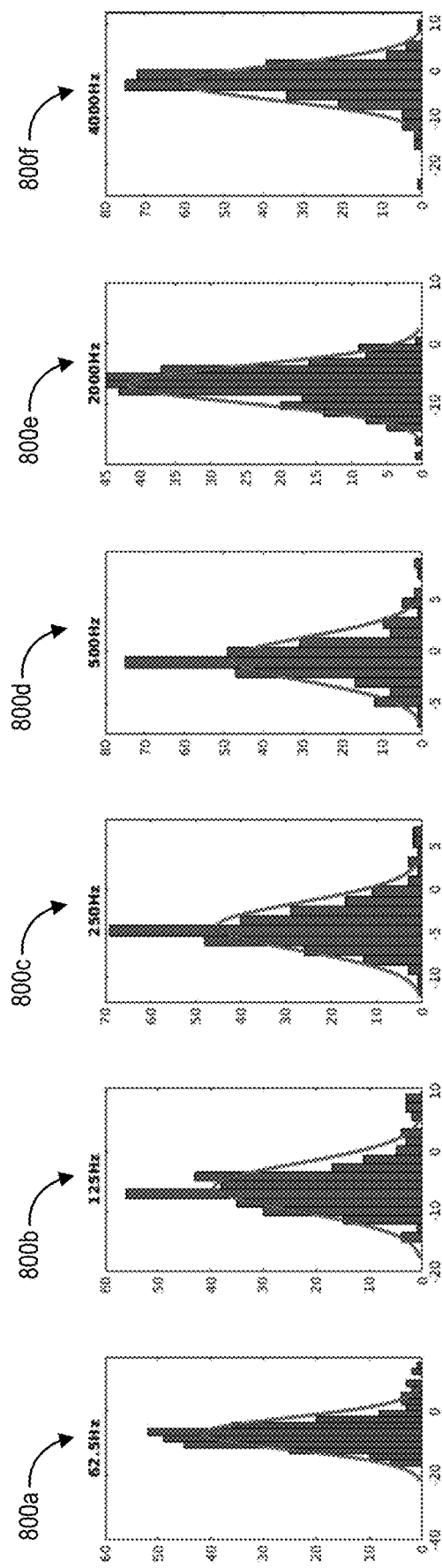
FIGS. 8A-8D illustrate diagrams of impulse response equalizations and distributions in accordance with one or more implementations.
Figure 8C:
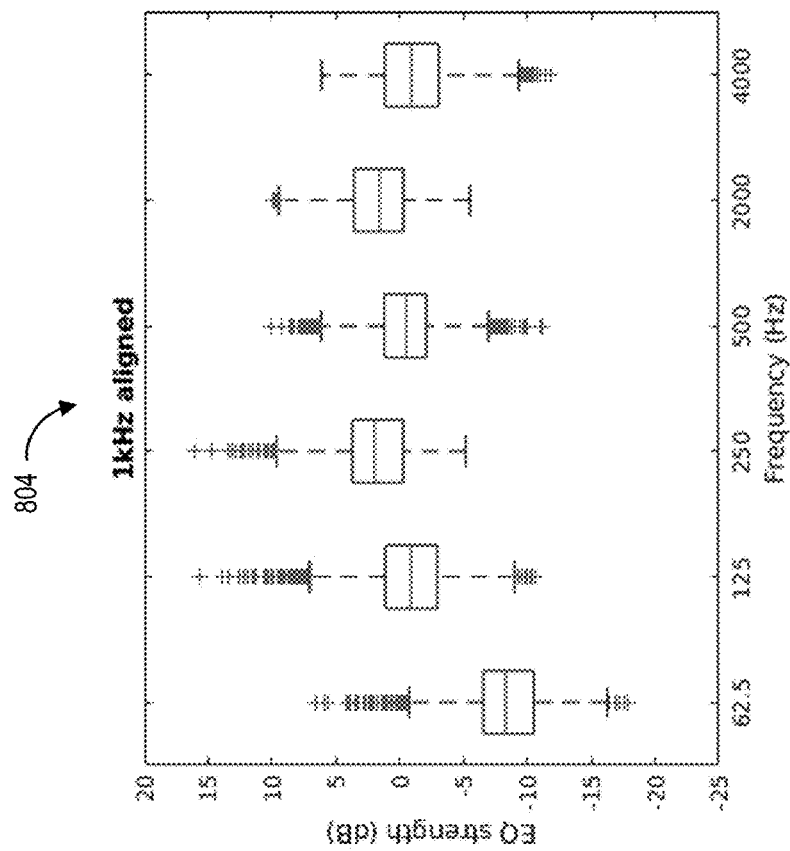
Figure 8B:
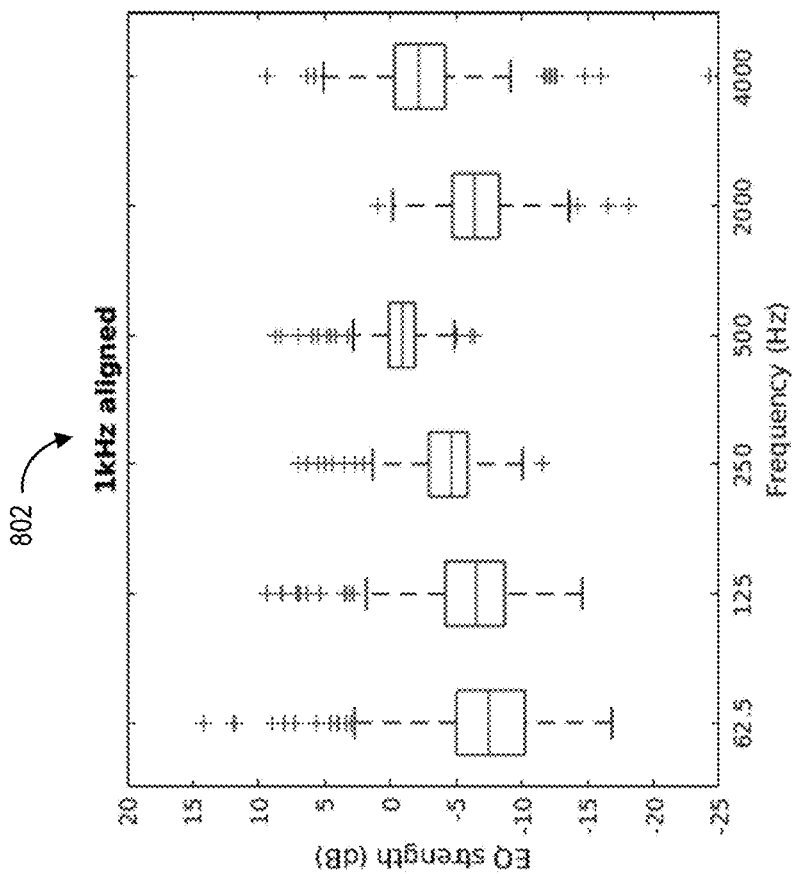
Figure 8D:
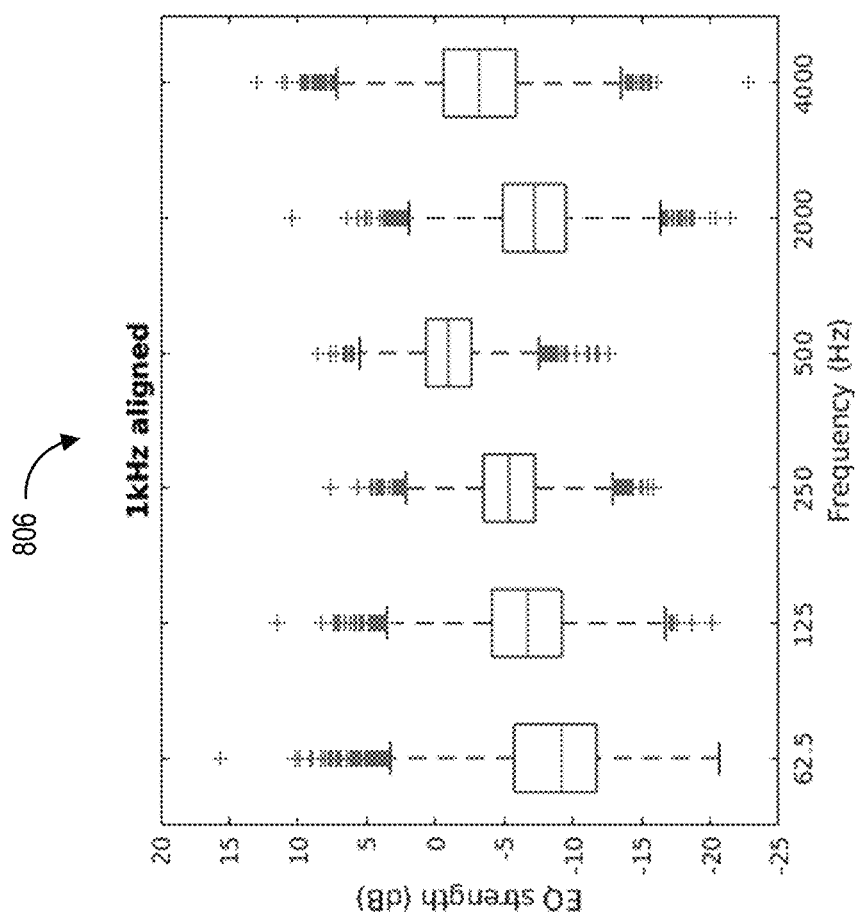

FIGS. 8A-8D illustrate equalization data corresponding to measured impulse responses and synthetic impulse responses, as described with respect to FIG. 6. Specifically, FIG. 8A illustrates a plurality of normal distributions applied to equalization gains of measured impulse responses for a plurality of frequency sub-bands. FIG. 8B illustrates equalizations for randomly sampled values from measured impulse responses (e.g., target impulse responses). FIG. 8C illustrates equalizations for synthetic impulse responses (e.g., source impulse responses). FIG. 8D illustrates equalizations for new synthetic impulse responses based on randomly sampled equalizations from the target impulse responses relative to the source impulse responses.

As mentioned, FIG. 8A illustrates equalization gains of a plurality of measured impulse responses fitted to normal distributions corresponding to a set of frequency sub-bands 800a-800f. For example, the audio rendering system 102 can determine the mean and standard deviation of equalization gains within a first frequency sub-band 800a. The audio rendering system 102 can then generate a normal distribution (e.g., a Gaussian) that represents the equalization gains for the first frequency sub-band 800a. The audio rendering system 102 can randomly sample from each of the frequency sub-bands 800a-800f to obtain a plurality of randomly sampled equalization gain values. The audio rendering system 102 can use the randomly sampled values to generate a filter that the audio rendering system 102 can use to generate a new synthetic impulse response.

For example, FIG. 8B illustrates target equalizations 802 based on randomly sampled equalizations from the normal distributions. As shown, the target equalizations 802 include different equalization values for the set of frequency sub-bands. The audio rendering system 102 can compare the target equalizations 802 to source equalizations 804, shown in FIG. 8C, which correspond to previously generated synthetic impulse responses. The audio rendering system 102 can generate filters based on the differences between the source equalizations 804 and the target equalizations 802 and then modify the source equalizations 804 using the filter to create new synthetic equalizations 806, shown in FIG. 8D. As FIGS. 8B and 8D illustrate, the distribution of the new synthetic equalizations 806 is similar to the distribution of the target equalizations 802, which indicates that the augmented portion of the training dataset can incorporate acoustic information from the measured impulse responses, thereby improving the accuracy of the neural networks.

In a specific implementation of the audio rendering system 102, the audio rendering system 102 provides improvements over conventional systems. In particular, as described by D. Li, T. R. Langlois, and C. Zheng in Scene-aware audio for 360° videos, *ACM Trans. Graph.*, 37(4), 2018, ("Li") a previous system introduces scene-aware audio to optimize simulator parameters to match room acoustics from existing recordings. Also, as described by C. Schissler, C. Loftin, and D. Manocha in Acoustic classification and optimization for multi-modal rendering of real-world scenes, IEEE transactions on visualization and computer graphics, 24(3):1246-1259, 2017, ("Schissler") a previous system leverages visual information for acoustic material classification to include audio for 3D-reconstructed real-world scenes. Both of these systems, however, require explicit measurement of impulse responses for the environments. In contrast, the audio rendering system 102 is able to render scene-aware audio with any speech input signal and commodity microphones (e.g., in user client devices such as smartphones).

The table below provides a comparison between the performance of the audio rendering system 102 and Li with regard to error in equalizations and reverberation decay times for a plurality of different environments.

| Size (m³) | 1100 (irregular) | 1428 (12 × 12 × 7) | 990 (11 × 15 × 6) | 72 (4 × 6 × 3) | 352 (11 × 8 × 4) |
|---|---|---|---|---|---|
| Li $T_{60}$ error (s) | 0.11 | 0.23 | 0.08 | 0.02 | 0.10 |
| Li EQ error (dB) | 1.50 | 2.97 | 8.59 | 3.61 | 7.55 |
| System 102 $T_{60}$ error (s) | 0.14 | 0.12 | 0.10 | 0.04 | 0.24 |
| System 102 EQ error (dB) | 2.26 | 3.86 | 3.97 | 3.46 | 4.62 |

As shown in the table above, the audio rendering system 102 produces error that is comparable to, or better than, Li, which relies on explicitly measured impulse responses.

Additionally, in contrast to the system in Schissler, the audio rendering system 102 compensates wave effects explicitly with an equalization filter. This allows the audio rendering system 102 to better reproduce fast decay in the high-frequency range to closely match a recorded sound. Furthermore, the audio rendering system 102 provides additional advantages over conventional systems by producing audio with decay tail that better matches the audio recordings. In contrast to some of the conventional systems (e.g., as described by H. Kim, L. Remaggi, P. Jackson, and A. Hilton in Immersive spatial audio reproduction for vr/ar using room acoustic modelling from 360 images, *Proceedings IEEE VR*2019, 2019), the conventional systems produce a longer reverb tail than a recorded ground truth.

Figure 9:
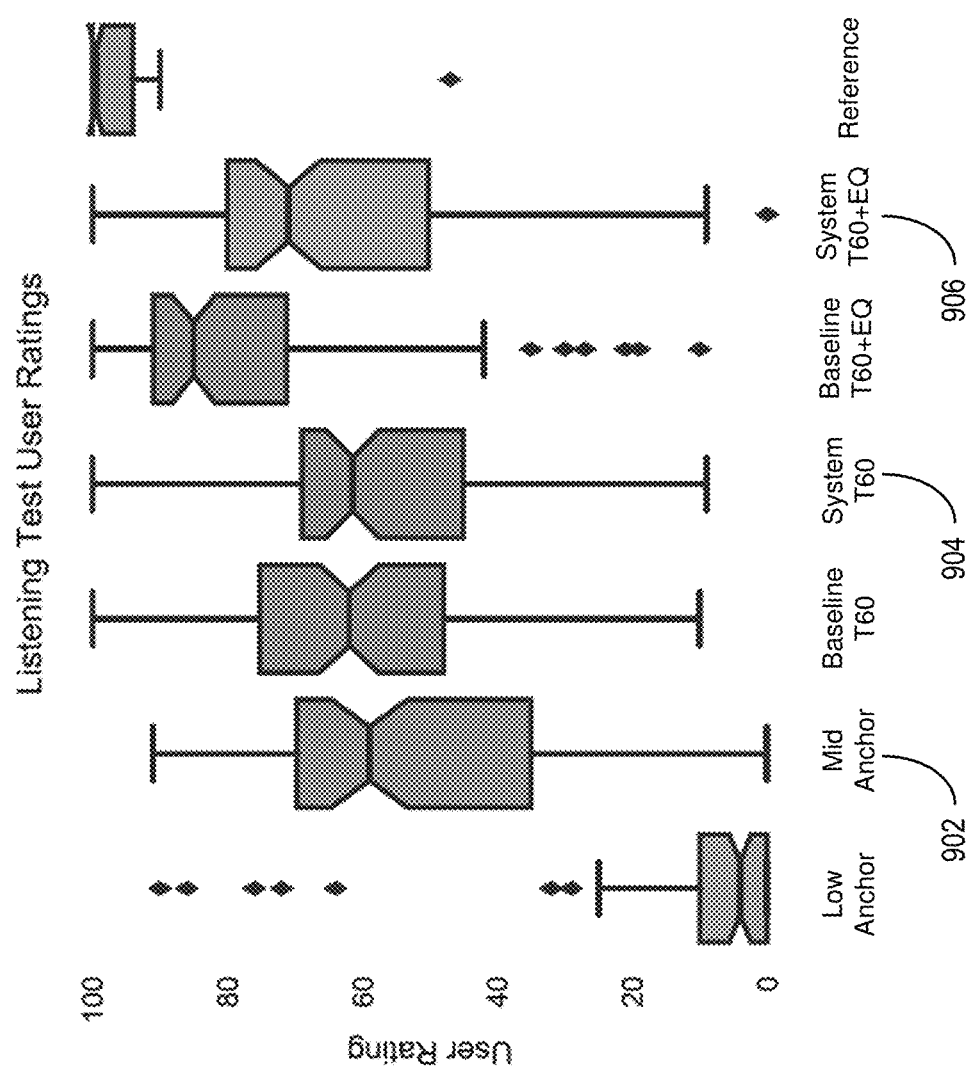
FIG. 9 illustrates a diagram of plotted results of a user ratings test based on rendered audio using different methods in accordance with one or more implementations.

Additionally, FIG. 9 illustrates results for a listening test presented to a plurality of participants. Specifically, the participants responded to a prompt to rate how similar each recording was to an explicit reference. The recordings all had the same content, but different acoustic conditions. As shown, the audio rendering system 102 produced results that participants rated better than a mid-anchor stimulus 900 by a statistically significant amount (e.g., ~10 rating points on a 100 point scale). More specifically, the audio rendering system 102 produced better results with a stimulus 902 using only the predicted reverberation decay times, as well as with a stimulus 904 using the predicted reverberation decay times in conjunction with the predicted environment equalizations.

Figure 10:
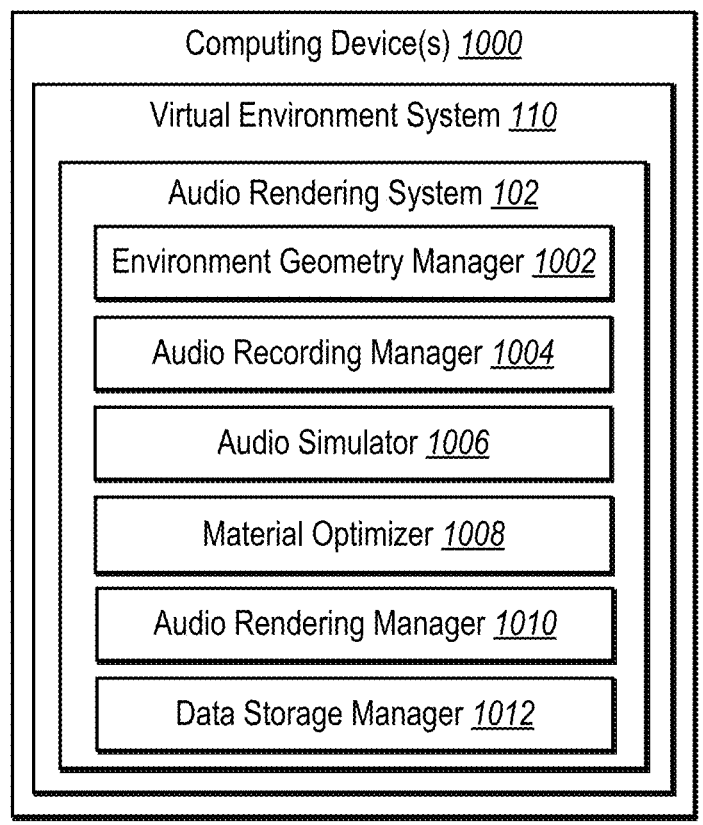
FIG. 10 illustrates a diagram of the audio rendering system of FIG. 1 in accordance with one or more implementations.

As described in relation to FIGS. FIGS. 2-9, the audio rendering system 102 can perform operations for scene-aware rendering of audio using neural networks to predict acoustic properties of a user environment. The operations allow the audio rendering system 102 to efficiently and accurately render digital audio to have similar acoustic properties to audio within a user environment. FIG. 10 illustrates a detailed schematic diagram of an embodiment of the audio rendering system 102 described above. As shown, the audio rendering system 102 can be implemented in a virtual environment system 110 on computing device(s) 1000 (e.g., a client device and/or server device as described in FIG. 1 and as further described below in relation to FIG. 12). Additionally, the audio rendering system 102 can include, but is not limited to, an environment geometry manager 1002, an audio recording manager 1004, an audio simulator 1006, a material optimizer 1008, an audio rendering manager 1010, and a data storage manager 1012. The audio rendering system 102 can be implemented on any number of computing devices. For example, the audio rendering system 102 can be implemented in a distributed system of server devices for rendering digital media within an immersive environment. The audio rendering system 102 can also be implemented within one or more additional systems. Alternatively, the audio rendering system 102 can be implemented on a single computing device such as a single client device.

In one or more embodiments, each of the components of the audio rendering system 102 is in communication with other components using any suitable communication technologies. Additionally, the components of the audio rendering system 102 can be in communication with one or more other devices including other computing devices of a user, server devices (e.g., cloud storage devices), licensing servers, or other devices/systems. It will be recognized that although the components of the audio rendering system 102 are shown to be separate in FIG. 10, any of the subcomponents may be combined into fewer components, such as into a single component, or divided into more components as may serve a particular implementation. Furthermore, although the components of FIG. 10 are described in connection with the audio rendering system 102, at least some of the components for performing operations in conjunction with the audio rendering system 102 described herein may be implemented on other devices within the environment.

The components of the audio rendering system 102 can include software, hardware, or both. For example, the components of the audio rendering system 102 can include one or more instructions stored on a computer-readable storage medium and executable by processors of one or more computing devices (e.g., the computing device(s) 600). When executed by the one or more processors, the computer-executable instructions of the audio rendering system 102 can cause the computing device(s) 600 to perform the audio rendering operations described herein. Alternatively, the components of the audio rendering system 102 can include hardware, such as a special purpose processing device to perform a certain function or group of functions. Additionally, or alternatively, the components of the audio rendering system 102 can include a combination of computer-executable instructions and hardware.

Furthermore, the components of the audio rendering system 102 performing the functions described herein with respect to the audio rendering system 102 may, for example, be implemented as part of a stand-alone application, as a module of an application, as a plug-in for applications, as a library function or functions that may be called by other applications, and/or as a cloud-computing model. Thus, the components of the audio rendering system 102 may be implemented as part of a stand-alone application on a personal computing device or a mobile device. Alternatively, or additionally, the components of the audio rendering system 102 may be implemented in any application that provides audio rendering, including, but not limited to ADOBE® AUDITION®, ADOBE® CREATIVE CLOUD® software. "ADOBE," "ADOBE AUDITION," and "CREATIVE CLOUD" are registered trademarks of Adobe in the United States and/or other countries.

As mentioned, the audio rendering system 102 can include an environment geometry manager 1002. The environment geometry manager 1002 can facilitate obtaining, generating, and managing environment geometries representing user environments. For example, the environment geometry manager 1002 can communicate with a user client device or other device to obtain a computer representation of a user environment. The environment geometry manager 1002 can also communicate with one or more other components of the audio rendering system 102 to use the environment geometries in rendering scene-aware audio.

The audio rendering system 102 can also include an audio recording manager 1004 to facilitate management of audio recordings associated with user environments. To illustrate, the audio recording manager 1004 can capture audio recordings via a recording application using an audio capture device within a user environment or from a video clip within the user environment. The audio recording manager 1004 can alternatively obtain an audio recording from a separate computing device.

The audio recording manager 1004 can also analyze the audio recordings using neural networks to predict acoustic properties of a user environment. For instance, the audio recording manager 1004 can analyze an audio recording using a plurality of convolutional neural networks to predict environment equalizations and reverberation decay times of the user environment at various frequency sub-bands. The audio recording manager 1004 can also map the predicted acoustic properties to the audio recordings and corresponding user environments.

Additionally, the audio rendering system 102 can include an audio simulator 1006 to facilitate the generation of audio simulation models of user environments. Specifically, the audio simulator 1006 can use information about a user environment to simulate the propagation of sound waves within the user environment. For instance, the audio simulator 1006 can use an environment geometry for an environment to estimate how sound interacts with surfaces in the user environment based on material properties. The audio simulator 1006 can thus estimate energies (e.g., amplitudes) of audio originating at a source when the audio reaches a target.

In connection with the audio simulator 1006, the audio rendering system 102 can include a material optimizer 1008 to facilitate the optimization of material parameters of surface materials in a user environment. To illustrate, the material optimizer 1008 can optimize material parameters (e.g., material absorption coefficients) for surfaces in a user environment by comparing an output of the audio simulator 1006 to predicted acoustic properties of the user environment to determine materials of the user environment. In particular, the material optimizer 1008 can modify material absorption coefficients so that the acoustic properties of a virtualized environment match the acoustic properties of the user environment.

Additionally, the audio rendering system 102 includes an audio rendering manager 1010. The audio rendering manager 1010 facilitates the generation of scene-aware audio samples that take into account the acoustic properties of user environments. For example, the audio rendering manager 1010 can use environment equalizations, material parameters, and environment geometries to generate audio samples that have similar acoustic properties to other audio within the corresponding user environments. Additionally, the audio rendering manager 1010 can modify existing (e.g., pre-recorded) audio samples or live-streaming audio samples according to the acoustic properties of a user environment.

Additionally, the audio rendering system 102 also includes a data storage manager 1012 (that comprises a non-transitory computer memory/one or more memory devices) that stores and maintains data associated with rendering scene-aware audio for user environments. For example, the data storage manager 1012 can store information associated with the user environments, audio recordings, and virtualized environments corresponding to the user environments. To illustrate, the data storage manager 1012 can store environment geometries, audio recordings, material parameters, predicted acoustic properties, and rendered audio samples.

Figure 11:
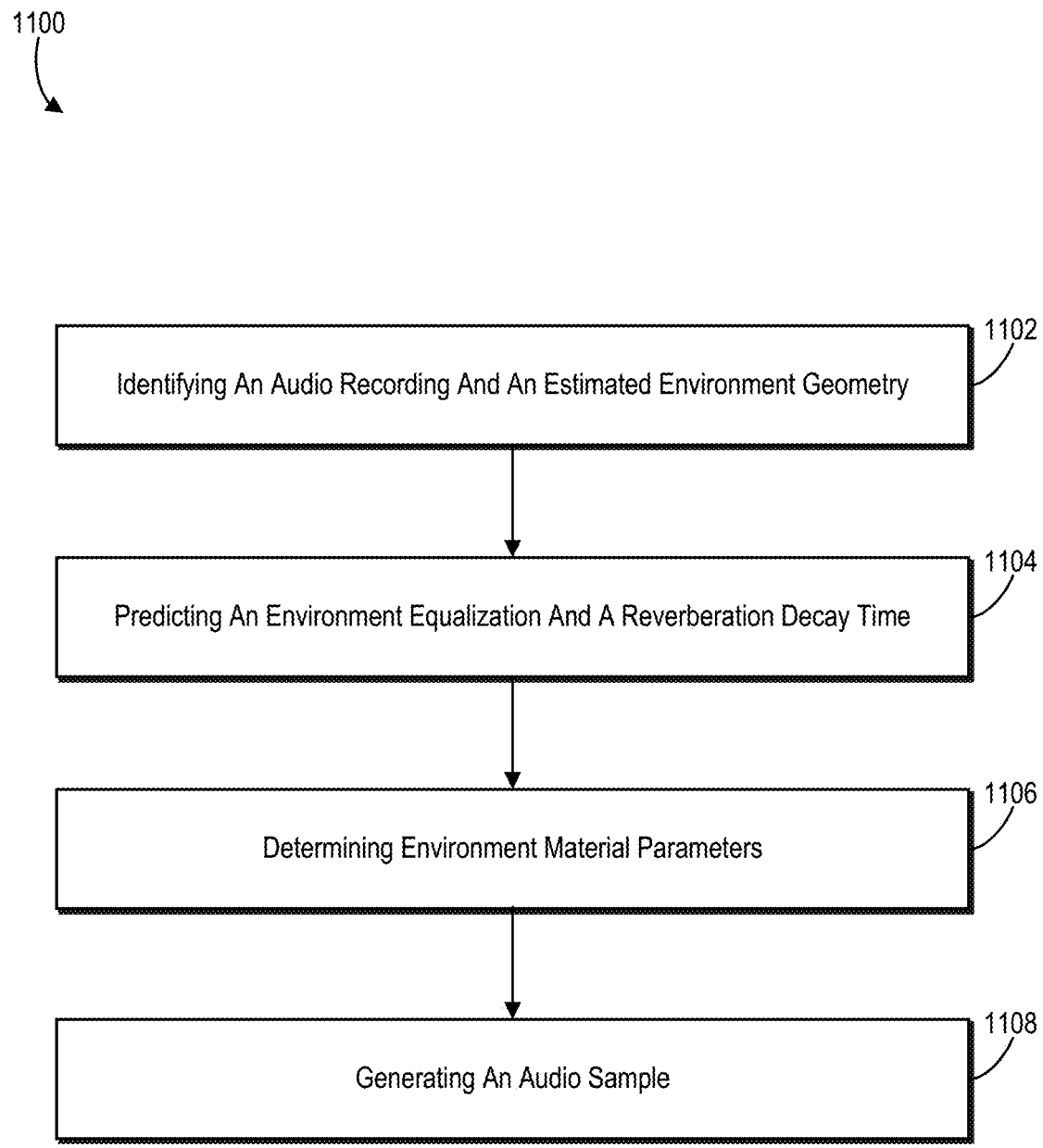
FIG. 11 illustrates a flowchart of a series of acts for generating scene-aware audio samples using neural networks in accordance with one or more implementations.

Turning now to FIG. 11, this figure shows a flowchart of a series of acts 1100 of using neural networks to predict acoustic properties of a user environment based on an audio recording for generating scene-aware audio samples. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

As shown, the series of acts 1100 includes an act 1102 of identifying an audio recording of an environment and an estimated environment geometry for the environment. For example, act 1102 involves identifying an audio recording within a user environment and an estimated environment geometry for the user environment. For instance, the audio recording can include a speech recording captured by a client device within the user environment. Alternatively, act 1102 can include identifying an audio clip from video captured within the user environment.

The series of acts 1100 also includes an act 1104 of predicting an environment equalization and a reverberation decay time. For example, act 1104 involves predicting, using a neural network and based on the audio recording, an environment equalization and a reverberation decay time for the environment. Act 1104 can involve predicting, for the environment, a plurality of environment equalizations for a first set of frequency sub-bands. Additionally, act 1104 can involve predicting, for the environment, a plurality of reverberation decay times for a second set of frequency sub-bands.

For example, act 1104 can involve predicting the environment equalization for the user environment by analyzing the audio recording utilizing the equalization convolutional neural network. Act 1104 can also involve predicting the reverberation decay time for the user environment by analyzing the audio recording utilizing the reverberation convolutional neural network. The equalization convolutional neural network can be trained on a plurality of measured impulse responses for a plurality of environments. The reverberation convolutional neural network can be trained on the plurality of measured impulse responses for the plurality of environments. Additionally, the equalization convolutional neural network and the reverberation convolutional neural network can share a single neural network structure comprising different output layers corresponding to the first set of frequency sub-bands and the second set of frequency sub-bands.

Act 1104 can also involve predicting, utilizing the equalization convolutional neural network, a plurality of frequency-dependent environment equalizations corresponding to the environment for a first set of frequency sub-bands. Act 1104 can further involve predicting, utilizing the reverberation convolutional neural network, a plurality of frequency-dependent reverberation decay times corresponding to the environment for a second set of frequency sub-bands.

Additionally, the series of acts 1100 includes an act 1106 of determining environment material parameters. For example, act 1106 involves determining environment material parameters corresponding to the environment utilizing an audio simulation model based on the environment geometry and the reverberation decay time for the environment. For example, the environment material parameters can include frequency-dependent absorption coefficients of materials in the user environment. Act 1106 can involve applying an objective function that reduces a difference between a first slope of an audio simulation energy curve based on the audio simulation model and a second slope of a reverberation energy curve based on the reverberation decay time.

The series of acts 1100 further includes an act 1108 of generating an audio sample. For example, act 1108 involves generating an audio sample based on the environment geometry, the environment material parameters, and the environment equalization. Act 1108 can involve modifying an audio sample according to the environment material parameters and the environment equalization at a virtual location within the environment geometry. For example, the audio sample can include a pre-recorded audio sample or a live-streaming audio sample. Alternatively, act 1108 can involve generating a new audio sample according to the environment material parameters and the environment equalization at a virtual location within the environment geometry.

The series of acts 1100 can also include augmenting a training dataset used to train the neural network by modifying equalizations of a plurality of synthetic impulse responses based on sampled equalizations of a plurality of measured impulse responses. For example, the series of acts 1100 can augment the training dataset by determining normal distributions representing equalization gains of the plurality of measured impulse responses at a set of frequency sub-bands. The series of acts 1100 can then include sampling a set of equalizations from the normal distributions, and applying the set of equalizations from the normal distributions to the plurality of synthetic impulse responses to generate new synthetic impulse responses. Alternatively, the series of acts 1100 can include applying the set of equalizations from the normal distributions to a set of measured impulse responses to generate new synthetic impulse responses.

For example, the series of acts 1100 can apply the set of equalizations from the normal distributions to the plurality of synthetic impulse responses by calculating a difference between a source equalization of a synthetic impulse response from the plurality of synthetic impulse responses and a target equalization of a sample from the set of normal distributions. The series of acts 1100 can include generating a filter associated with the difference between the source equalization and the target equalization. The series of acts 1100 can then include applying the filter to a synthetic impulse response of the plurality of synthetic impulse responses.

The series of acts 1100 can include sampling the set of equalizations from the normal distributions by identifying initial variances of the normal distributions. The series of acts 110 can then include generating modified normal distributions by increasing the initial variances to a target variance, and sampling the set of equalizations from the modified normal distributions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
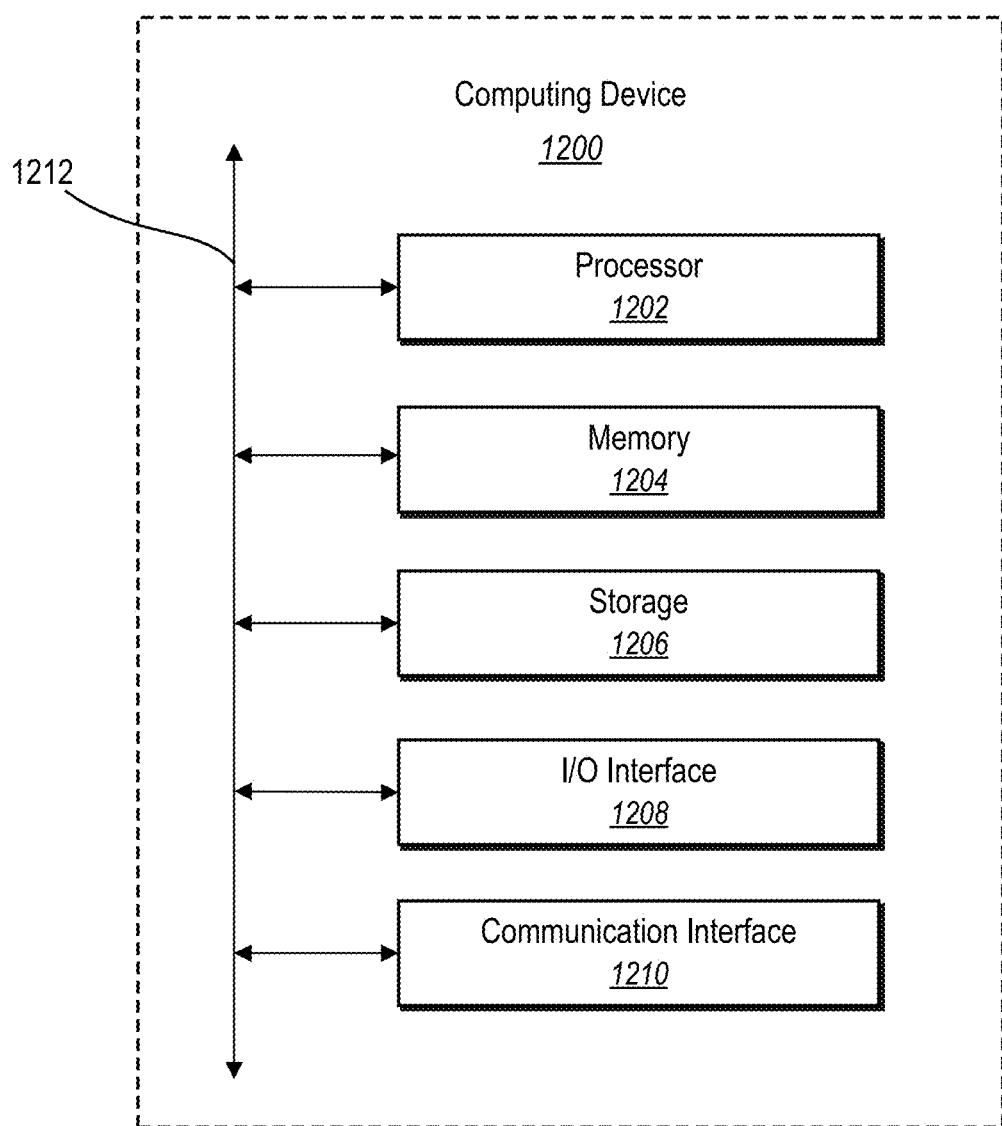
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
 determining, by at least one processor and based on an audio recording within an environment, a first energy curve by utilizing an audio simulation model to estimate sound paths within the environment by simulating paths of a plurality of audio rays via ray tracing according to an environment geometry of the environment and a reverberation decay time of the environment within a three-dimensional virtual representation generated for the environment;
 modifying, by the at least one processor, material parameters of materials of surfaces within the three-dimensional virtual representation of the environment based on a difference between the first energy curve and a second energy curve corresponding to the reverberation decay time of the environment; and
 generating, by the at least one processor, an audio sample based on the environment geometry, the material parameters, and an environment equalization of the environment.

2. The computer-implemented method as recited in claim 1, wherein modifying the material parameters of the materials comprises:
 determining a first slope of the first energy curve and a second slope of the second energy curve; and
 reducing a difference between the first slope of the first energy curve and the second slope of the second energy curve.

3. The computer-implemented method as recited in claim 2, wherein reducing the difference between the first slope of the first energy curve and the second slope of the second energy curve comprises modifying absorption coefficients associated with the materials of the surfaces to change the first slope of the first energy curve.

4. The computer-implemented method as recited in claim 1, wherein determining the first energy curve comprises generating, utilizing the audio simulation model, a plurality of simulated sound paths reflected by the surfaces within the three-dimensional virtual representation of the environment according to an initial set of materials of the surfaces.

5. The computer-implemented method as recited in claim 4, wherein modifying the material parameters of the materials comprises:
 determining initial material parameters within the three-dimensional virtual representation of the environment for the initial set of materials of the surfaces;
 determining modified material parameters by changing the initial material parameters within the three-dimensional virtual representation based on the difference between the first energy curve and the second energy curve; and
 determining an updated set of materials comprising the modified material parameters for the surfaces within the three-dimensional virtual representation of the environment.

6. The computer-implemented method as recited in claim 4, wherein modifying the material parameters of the materials of the surfaces within the three-dimensional virtual representation of the environment comprises utilizing the audio simulation model to determine whether the plurality of simulated sound paths reach a location within the three-dimensional virtual representation of the environment and how long each estimated sound path takes to reach the location according to the environment geometry and the reverberation decay time within the three-dimensional virtual representation of the environment.

7. The computer-implemented method as recited in claim 1, wherein generating the audio sample comprises modifying an audio recording comprising a pre-recorded audio sample according to the material parameters of the materials of the surfaces and the environment equalization at a virtual location within the environment geometry.

8. The computer-implemented method as recited in claim 1, further comprising determine, utilizing one or more neural networks, the environment equalization and the reverberation decay time from the audio recording within the environment.

9. The computer-implemented method as recited in claim 8, wherein determining the environment equalization and the reverberation decay time comprises:
 determining, utilizing the one or more neural networks, a plurality of frequency-dependent environment equalizations for a first set of frequency sub-bands; and
 determining, utilizing the one or more neural networks, a plurality of frequency-dependent reverberation decay times for a second set of frequency sub-bands.

10. A system comprising:
 one or more memory devices comprising an environment geometry of an environment; and
 one or more processors coupled to the one or more memory devices that cause the system to perform operations comprising:
 determining, based on an audio recording within the environment, a first energy curve by utilizing an audio simulation model to estimate sound paths within the environment by simulating paths of a plurality of audio rays via ray tracing according to the environment geometry of the environment and a reverberation decay time of the environment within a three-dimensional virtual representation generated for the environment;
 determining a second energy curve corresponding to the reverberation decay time of the environment;
 modifying material parameters of materials of surfaces within the three-dimensional virtual representation of the environment by modifying the first energy curve to reduce a difference between the first energy curve and the second energy curve; and
 generating an audio sample based on the environment geometry, the material parameters, and an environment equalization of the environment.

11. The system as recited in claim 10, wherein modifying the material parameters of the materials comprises reducing the difference between the first energy curve and the second energy curve by modifying an initial set of material parameters according to a slope of the first energy curve based on the difference between the first energy curve and the second energy curve.

12. The system as recited in claim 11, wherein modifying the initial set of material parameters comprises modifying frequency-based absorption coefficients of the materials of the surfaces to change the slope of the first energy curve at a particular frequency sub-band to fit a slope of the second energy curve at the particular frequency sub-band.

13. The system as recited in claim 12, wherein determining the second energy curve comprises:
determining, utilizing one or more neural networks, the environment equalization and the reverberation decay time from the audio recording within the environment; and
determining the second energy curve for the particular frequency sub-band from a plurality of energy curves based on frequency-dependent reverberation decay times at a plurality of frequency sub-bands.

14. The system as recited in claim 10, wherein determining the first energy curve comprises utilizing the audio simulation model to determine whether the estimated sound paths reach a location within the three-dimensional virtual representation of the environment and how long each estimated sound path takes to reach the location according to the environment geometry, the reverberation decay time, and an initial set of materials of the surfaces within the three-dimensional virtual representation of the environment.

15. The system as recited in claim 10, wherein the operations further comprise determining, utilizing one or more neural networks, the environment equalization and the reverberation decay time from an audio recording captured within the environment by:
determining, utilizing the one or more neural networks, a plurality of frequency-dependent environment equalizations for a first set of frequency sub-bands; and
determining, utilizing the one or more neural networks, a plurality of frequency-dependent reverberation decay times for a second set of frequency sub-bands, the second set of frequency sub-bands being different than the first set of frequency sub-bands.

16. The system as recited in claim 15, wherein modifying the material parameters of the materials comprises determining frequency-dependent material parameters for a plurality of frequency sub-bands independently from each other based on the plurality of frequency-dependent environment equalizations at the first set of frequency sub-bands and the plurality of frequency-dependent reverberation decay times at the second set of frequency sub-bands.

17. A non-transitory computer readable storage medium comprising instructions that, when executed by at least one processor, cause the at least one processor to perform operations comprising:
determining, for an environment, an environment geometry and a reverberation decay time;
determining, based on an audio recording within the environment, a first energy curve by utilizing an audio simulation model to estimate interactions of sound paths with surfaces within a three-dimensional virtual representation of the environment via ray tracing according to the environment geometry and the reverberation decay time;
determining a second energy curve corresponding to the reverberation decay time of the environment;
modifying material parameters of materials of the surfaces within the three-dimensional virtual representation of the environment by modifying the first energy curve corresponding to the audio simulation model based on the second energy curve corresponding to the reverberation decay time; and
generating an audio sample based on the environment geometry, the material parameters, and an environment equalization of the environment.

18. The non-transitory computer readable storage medium as recited in claim 17, wherein:
determining the first energy curve comprises utilizing the audio simulation model with initial material parameters of the materials of the surfaces within the three-dimensional virtual representation of the environment; and
modifying the material parameters comprises updating the initial material parameters of the materials of the surfaces to reduce a difference between the first energy curve and the second energy curve.

19. The non-transitory computer readable storage medium as recited in claim 17, wherein the operations further comprise:
determining the environment equalization by determining, utilizing an equalization convolutional neural network, a plurality of environment equalizations corresponding to the environment for a first set of frequency sub-bands; and
determining the reverberation decay time by determining, utilizing a reverberation decay time convolutional neural network, a plurality of reverberation decay times corresponding to the environment for a second set of frequency sub-bands.

20. The non-transitory computer readable storage medium as recited in claim 19, wherein modifying the material parameters of the materials of the surfaces by modifying a slope of the first energy curve at a sub-band from both the first set of frequency sub-bands and the second set of frequency sub-bands.

* * * * *